US012552433B2

(12) United States Patent
Pedersen et al.

(10) Patent No.: US 12,552,433 B2
(45) Date of Patent: Feb. 17, 2026

(54) SHOPPING CART GATE WITH CHILD SEAT AND ASSEMBLIES THEREOF

(71) Applicant: TARGET BRANDS, INC, Minneapolis, MN (US)

(72) Inventors: Sara L. Pedersen, Minneapolis, MN (US); Alex K. Poniatowski, New Hope, MN (US); Hermann Eichele, Leipheim (DE); Stefan Remmele, Offingen (DE); Dieter Stöckle, Landensberg (DE); Thomas Gasche, Leipheim (DE); Peter Irlbacher, Schwarzenfeld (DE); Johann Daminger, Neu-Ulm (DE); William Kiser, Lincolnton, NC (US)

(73) Assignee: TARGET BRANDS, INC, Minneapolis, MN (US)

( * ) Notice: Subject to any disclaimer, the term of this patent is extended or adjusted under 35 U.S.C. 154(b) by 95 days.

(21) Appl. No.: 18/383,865

(22) Filed: Oct. 25, 2023

(65) Prior Publication Data
US 2024/0140511 A1    May 2, 2024

Related U.S. Application Data

(60) Provisional application No. 63/419,703, filed on Oct. 26, 2022.

(51) Int. Cl.
*B62B 3/14* (2006.01)
*B62B 5/00* (2006.01)
*B62B 3/18* (2006.01)

(52) U.S. Cl.
CPC ............ *B62B 3/144* (2013.01); *B62B 3/1472* (2013.01); *B62B 5/0009* (2013.01); *B62B 3/18* (2013.01)

(58) Field of Classification Search
CPC ..... B62B 3/144; B62B 3/1472; B62B 5/0009; B62B 3/18; B62B 3/14; B62B 3/182; B62B 3/186
See application file for complete search history.

(56) References Cited

U.S. PATENT DOCUMENTS

| | | | |
|---|---|---|---|
| 3,048,420 A | 8/1962 | Umanoff | |
| 3,787,063 A * | 1/1974 | Oliver | B62B 3/182 |
| | | | 280/33.996 |

(Continued)

FOREIGN PATENT DOCUMENTS

| | | |
|---|---|---|
| CA | 153457 A | 2/1914 |
| CH | 630856 | 7/1982 |

(Continued)

OTHER PUBLICATIONS

WO-2014144880-A2 English Translation (Year: 2014).*

(Continued)

*Primary Examiner* — Michael T. Walsh
(74) *Attorney, Agent, or Firm* — Griffiths & Seaton PLLC; JoAnn M. Seaton

(57) ABSTRACT

A shopping cart includes a wheeled base, two support masts, a basket, and a gate. The two support masts are coupled to and extend upwardly from the wheeled base. The basket is coupled to the two support masts and extends over the wheeled base to define a compartment having a rear opening. The gate includes a primary panel and a child seat. The primary panel is rotatable between a first position, covering the rear opening, and a second position extending above the compartment. The child seat extends from a front surface of the primary panel and into the compartment when the primary panel is in the first position. The child seat comprises a bottom panel, a back, and side panels. The bottom panel and opposing side panels collectively form a child seat (Continued)

surround extending from a first side of the primary panel to a second side of the primary panel.

20 Claims, 14 Drawing Sheets

(56) References Cited

U.S. PATENT DOCUMENTS

| | | | |
|---|---|---|---|
| D283,264 S | 4/1986 | Strasbourg | |
| 4,647,055 A | 3/1987 | Weill | |
| 4,682,782 A | 7/1987 | Mills | |
| D294,419 S | 2/1988 | Rehrig | |
| D296,259 S | 6/1988 | Rehrig | |
| 5,012,966 A | 5/1991 | Turner et al. | |
| D321,577 S | 11/1991 | Ellis et al. | |
| 5,074,570 A | 12/1991 | Ferris et al. | |
| 5,131,669 A | 7/1992 | Kinnamon et al. | |
| D328,812 S | 8/1992 | Pritchett | |
| 5,137,295 A | 8/1992 | Peek | |
| 5,154,330 A | 10/1992 | Haynes | |
| 5,181,733 A | 1/1993 | Tague | |
| 5,199,728 A | 4/1993 | James | |
| 5,211,410 A | 5/1993 | Trubiano | |
| 5,277,473 A * | 1/1994 | Kelly | B62B 3/1444 280/33.993 |
| 5,316,328 A | 5/1994 | Bussinger | |
| 5,385,357 A | 1/1995 | Trubiano | |
| D357,784 S | 4/1995 | Ince | |
| 5,505,472 A | 4/1996 | Trubiano | |
| D379,706 S | 6/1997 | Hurst | |
| D379,834 S | 6/1997 | Huang | |
| 5,651,557 A | 7/1997 | De | |
| D383,284 S | 9/1997 | Lines | |
| 5,702,114 A | 12/1997 | Downing et al. | |
| 5,821,512 A | 10/1998 | O'hagan et al. | |
| 5,821,513 A | 10/1998 | O'hagan et al. | |
| D400,678 S | 11/1998 | Clark et al. | |
| 5,836,422 A | 11/1998 | Hurst | |
| D404,880 S * | 1/1999 | Chipperfield | D34/27 |
| D417,763 S | 12/1999 | Monem | |
| D417,937 S | 12/1999 | Harris | |
| 6,041,876 A | 3/2000 | Pulver et al. | |
| D423,176 S | 4/2000 | Cherry et al. | |
| 6,098,999 A | 8/2000 | Anastasia | |
| 6,186,382 B1 | 2/2001 | Bergin et al. | |
| 6,186,521 B1 | 2/2001 | Divoky et al. | |
| 6,199,878 B1 | 3/2001 | Masserant et al. | |
| D443,968 S | 6/2001 | Porter | |
| D445,230 S | 7/2001 | Deal et al. | |
| D445,231 S | 7/2001 | Porter | |
| 6,311,941 B1 | 11/2001 | Feldmeyer | |
| 6,364,325 B1 | 4/2002 | Chalfant | |
| 6,422,580 B1 | 7/2002 | Hunter | |
| 6,453,588 B1 | 9/2002 | Lykens | |
| 6,464,238 B2 * | 10/2002 | Reiland | B62B 3/144 280/33.993 |
| D470,292 S | 2/2003 | Johnson et al. | |
| 6,540,240 B2 | 4/2003 | Nadeau et al. | |
| D482,172 S | 11/2003 | Johnson et al. | |
| D482,836 S | 11/2003 | Van Landingham, Jr. | |
| 6,676,139 B1 | 1/2004 | Saccani | |
| D492,829 S | 7/2004 | Babkes et al. | |
| D493,594 S | 7/2004 | Prather et al. | |
| 6,761,364 B2 | 7/2004 | Murar et al. | |
| 6,832,768 B2 | 12/2004 | Duchene et al. | |
| 6,926,291 B1 | 8/2005 | John | |
| 6,966,565 B1 | 11/2005 | Ryan et al. | |
| 6,981,708 B1 | 1/2006 | Tucker et al. | |
| 7,063,337 B2 | 6/2006 | Russell et al. | |
| D528,870 S | 9/2006 | Ryan | |
| 7,104,552 B2 | 9/2006 | Swanson et al. | |
| D530,478 S | 10/2006 | Splain et al. | |
| D536,502 S | 2/2007 | Weigand et al. | |
| 7,182,349 B2 | 2/2007 | Prather et al. | |
| D540,998 S | 4/2007 | Splain et al. | |
| 7,225,903 B2 | 6/2007 | Nebolon et al. | |
| 7,234,711 B2 | 6/2007 | Gordon et al. | |
| D546,021 S | 7/2007 | Splain et al. | |
| D547,023 S | 7/2007 | Buerchner et al. | |
| 7,237,782 B2 | 7/2007 | Tucker et al. | |
| D550,423 S | 9/2007 | Spalin et al. | |
| 7,287,764 B2 | 10/2007 | Russell et al. | |
| D556,413 S | 11/2007 | Splain et al. | |
| D564,172 S | 3/2008 | Steinhobel | |
| 7,350,788 B2 | 4/2008 | Booker | |
| 7,384,049 B2 * | 6/2008 | Peota | B62B 3/144 280/33.993 |
| 7,392,992 B2 | 7/2008 | Stone et al. | |
| 7,396,025 B2 | 7/2008 | Ondrasik | |
| 7,398,976 B2 | 7/2008 | Splain et al. | |
| D575,472 S | 8/2008 | Splain et al. | |
| 7,407,169 B2 | 8/2008 | Splain et al. | |
| 7,410,178 B2 | 8/2008 | Splain et al. | |
| 7,416,194 B2 | 8/2008 | Splain et al. | |
| 7,443,295 B2 | 10/2008 | Brice et al. | |
| D582,122 S | 12/2008 | Splain et al. | |
| D583,523 S | 12/2008 | Deal et al. | |
| 7,494,135 B2 | 2/2009 | Ash et al. | |
| D588,774 S | 3/2009 | Peota et al. | |
| D588,775 S | 3/2009 | Peota et al. | |
| D589,852 S | 4/2009 | Giampavolo | |
| D591,474 S | 4/2009 | Peota et al. | |
| 7,600,763 B2 | 10/2009 | Splain et al. | |
| D607,173 S | 12/2009 | Selvig et al. | |
| 7,673,886 B2 | 3/2010 | Ondrasik | |
| 7,679,522 B2 | 3/2010 | Carpenter | |
| 7,741,808 B2 | 6/2010 | Fowler et al. | |
| 7,766,347 B2 | 8/2010 | Ryan et al. | |
| 7,780,902 B2 | 8/2010 | Pruitt, Jr. et al. | |
| D623,374 S | 9/2010 | Splain et al. | |
| 7,793,948 B2 | 9/2010 | Splain et al. | |
| 7,837,205 B2 | 11/2010 | Simard | |
| D628,759 S | 12/2010 | Walter | |
| 7,849,615 B2 | 12/2010 | Giampavolo | |
| 7,934,647 B1 | 5/2011 | Mims et al. | |
| D639,521 S | 6/2011 | Walter | |
| 7,959,166 B2 | 6/2011 | Splain et al. | |
| D641,532 S | 7/2011 | Peota et al. | |
| D643,175 S | 8/2011 | Peota et al. | |
| D644,393 S | 8/2011 | Walter | |
| 8,002,290 B2 | 8/2011 | Russell et al. | |
| D644,809 S | 9/2011 | Walter | |
| D644,810 S | 9/2011 | Peota et al. | |
| D645,222 S | 9/2011 | Walter | |
| D645,631 S | 9/2011 | Walter | |
| D646,041 S | 9/2011 | Berthiaume et al. | |
| D648,915 S | 11/2011 | Walter | |
| D649,732 S | 11/2011 | Muscara | |
| 8,052,158 B2 | 11/2011 | Tyrrell | |
| 8,056,909 B2 | 11/2011 | Burdwood et al. | |
| 8,066,291 B2 | 11/2011 | Cagan et al. | |
| D654,242 S | 2/2012 | Berthiaume et al. | |
| 8,162,331 B2 | 4/2012 | Simonson et al. | |
| D658,841 S | 5/2012 | Walter | |
| D659,936 S | 5/2012 | Berthiaume et al. | |
| D660,542 S | 5/2012 | Walter | |
| 8,245,894 B2 | 8/2012 | Buehler | |
| 8,256,651 B2 | 9/2012 | Reynolds | |
| 8,256,777 B2 | 9/2012 | Deal et al. | |
| D671,292 S | 11/2012 | Long et al. | |
| 8,313,114 B1 | 11/2012 | Aron | |
| D672,111 S | 12/2012 | Walter | |
| D672,933 S | 12/2012 | Fredendall et al. | |
| 8,360,441 B2 | 1/2013 | Caruso et al. | |
| D681,304 S | 4/2013 | Peter et al. | |
| D681,900 S | 5/2013 | Fredendall et al. | |
| D683,102 S | 5/2013 | Muscara | |
| D685,972 S | 7/2013 | Walter | |
| 8,534,520 B1 | 9/2013 | Liparoti | |
| D692,201 S | 10/2013 | Walter | |
| D693,981 S | 11/2013 | Walter | |
| D696,483 S | 12/2013 | Otterlee et al. | |
| 8,602,373 B2 | 12/2013 | Beckey et al. | |
| D698,114 S | 1/2014 | Smith et al. | |

(56) References Cited

U.S. PATENT DOCUMENTS

| | | | |
|---|---|---|---|
| 8,632,080 | B2 | 1/2014 | Russell et al. |
| D700,762 | S | 3/2014 | Walter |
| D702,910 | S | 4/2014 | Long et al. |
| 8,690,166 | B2 | 4/2014 | Peota et al. |
| D707,011 | S | 6/2014 | Peter et al. |
| 8,827,281 | B2 | 9/2014 | Smith |
| 8,991,836 | B2 | 3/2015 | Walter et al. |
| D733,388 | S | 6/2015 | Stauff et al. |
| 9,085,314 | B2 | 7/2015 | Selvig et al. |
| D742,612 | S | 11/2015 | Walter |
| D751,264 | S | 3/2016 | Walter |
| 9,321,473 | B2 | 4/2016 | Kiser, III |
| D760,464 | S | 6/2016 | Dyer et al. |
| D763,536 | S | 8/2016 | Walter et al. |
| 9,637,152 | B2 | 5/2017 | Dyer et al. |
| 9,663,132 | B2 | 5/2017 | Long |
| 9,676,406 | B1 | 6/2017 | Kocurek et al. |
| D794,897 | S | 8/2017 | Dyer et al. |
| D796,769 | S | 9/2017 | Stauff et al. |
| D800,986 | S | 10/2017 | Magnusson |
| D806,976 | S | 1/2018 | Peota et al. |
| D813,486 | S | 3/2018 | Stauff et al. |
| D818,237 | S | 5/2018 | Walter et al. |
| D836,949 | S | 1/2019 | Long et al. |
| D838,929 | S | 1/2019 | Villanova Abadía et al. |
| D849,351 | S | 5/2019 | Harrison et al. |
| D850,051 | S | 5/2019 | Harrison et al. |
| D850,052 | S | 5/2019 | Harrison et al. |
| D850,754 | S | 6/2019 | Peota et al. |
| D868,412 | S | 11/2019 | Wieth et al. |
| 10,479,387 | B2 | 11/2019 | Eberlein |
| D870,412 | S | 12/2019 | Harrison et al. |
| D874,779 | S | 2/2020 | Wieth et al. |
| 10,556,609 | B2 | 2/2020 | Harrison et al. |
| 10,577,007 | B2 | 3/2020 | Gasche et al. |
| D886,404 | S | 6/2020 | Stauff et al. |
| D895,920 | S | 9/2020 | Villanova Abadía et al. |
| D905,370 | S | 12/2020 | Poirier et al. |
| D914,317 | S | 3/2021 | Ebling et al. |
| D914,318 | S | 3/2021 | Ebling et al. |
| 10,933,899 | B2 | 3/2021 | Harrison et al. |
| 10,949,910 | B2 | 3/2021 | Carpenter et al. |
| D919,921 | S | 5/2021 | Mcmurtrey |
| D926,414 | S | 7/2021 | Villanova Abadía et al. |
| 11,059,506 | B2 | 7/2021 | Hagen et al. |
| 11,155,291 | B2 | 10/2021 | Joaquin |
| D936,325 | S | 11/2021 | Nelson |
| D937,527 | S | 11/2021 | Irwin et al. |
| D941,548 | S | 1/2022 | Ebling et al. |
| D1,004,893 | S | 11/2023 | Irwin et al. |
| 11,884,315 | B1 * | 1/2024 | Burch ................ B62B 3/1416 |
| D1,049,539 | S | 10/2024 | Cheng et al. |
| D1,054,646 | S | 12/2024 | Hogan et al. |
| 2002/0020976 | A1 | 2/2002 | Nadeau et al. |
| 2002/0135144 | A1 | 9/2002 | Murar et al. |
| 2003/0057666 | A1 * | 3/2003 | Murar ..................... B62B 3/14 |
| | | | 280/33.991 |
| 2003/0116933 | A1 | 6/2003 | Nadeau et al. |
| 2004/0046341 | A1 | 3/2004 | Wilkinson |
| 2004/0090025 | A1 | 5/2004 | Frommherz |
| 2005/0082792 | A1 | 4/2005 | Gordon et al. |
| 2005/0212235 | A1 | 9/2005 | Hammerling |
| 2005/0241889 | A1 | 11/2005 | Nebolon et al. |
| 2006/0186621 | A1 | 8/2006 | Buckley |
| 2006/0273535 | A1 | 12/2006 | O'Quin |
| 2006/0289637 | A1 | 12/2006 | Brice et al. |
| 2007/0063463 | A1 | 3/2007 | Splain et al. |
| 2007/0063464 | A1 | 3/2007 | Splain et al. |
| 2007/0063465 | A1 | 3/2007 | Splain et al. |
| 2007/0210541 | A1 | 9/2007 | Johnson |
| 2008/0088101 | A1 | 4/2008 | Ferguson |
| 2008/0111328 | A1 | 5/2008 | Ryan et al. |
| 2008/0164640 | A1 | 7/2008 | Pruitt et al. |
| 2008/0231432 | A1 | 9/2008 | Stawar et al. |
| 2008/0237339 | A1 | 10/2008 | Stawar et al. |
| 2008/0238009 | A1 | 10/2008 | Carpenter |
| 2008/0243626 | A1 | 10/2008 | Stawar et al. |
| 2009/0058024 | A1 * | 3/2009 | Cagan ................... B62B 3/1468 |
| | | | 280/33.991 |
| 2009/0230643 | A1 | 9/2009 | Eckert et al. |
| 2009/0242717 | A1 | 10/2009 | Stonehouse |
| 2009/0301533 | A1 | 12/2009 | Caldwell |
| 2010/0276899 | A1 | 11/2010 | Burdwood et al. |
| 2011/0062675 | A1 | 3/2011 | Brown et al. |
| 2012/0067474 | A1 | 3/2012 | Fellema |
| 2013/0307235 | A1 | 11/2013 | Smith et al. |
| 2013/0307239 | A1 | 11/2013 | Smith et al. |
| 2013/0341370 | A1 | 12/2013 | Larson |
| 2014/0159327 | A1 | 6/2014 | Smith et al. |
| 2014/0265184 | A1 | 9/2014 | Lorenzo Rodriguez et al. |
| 2015/0053652 | A1 | 2/2015 | Peters et al. |
| 2016/0046313 | A1 | 2/2016 | Landwehr |
| 2018/0370554 | A1 | 12/2018 | Raza et al. |
| 2019/0039636 | A1 | 2/2019 | Bacallao et al. |
| 2019/0071109 | A1 | 3/2019 | Bacallao et al. |
| 2019/0210625 | A1 | 7/2019 | Harrison et al. |
| 2019/0329810 | A1 | 10/2019 | Gasche et al. |
| 2020/0139998 | A1 * | 5/2020 | Harrison ................ B62B 3/144 |
| 2020/0164909 | A1 | 5/2020 | Webert et al. |
| 2020/0211088 | A1 | 7/2020 | Stawar et al. |
| 2020/0216105 | A1 | 7/2020 | Mcmurtrey et al. |
| 2020/0223466 | A1 | 7/2020 | Sherman et al. |
| 2020/0247451 | A1 | 8/2020 | Streicher |
| 2022/0111883 | A1 | 4/2022 | Yuan |
| 2023/0143479 | A1 | 5/2023 | Hagen et al. |
| 2023/0146179 | A1 | 5/2023 | Hagen et al. |
| 2023/0147385 | A1 | 5/2023 | Hagen et al. |
| 2024/0132130 | A1 | 4/2024 | Pedersen |
| 2024/0132132 | A1 | 4/2024 | Pedersen |
| 2024/0140511 | A1 | 5/2024 | Pedersen |
| 2024/0140513 | A1 | 5/2024 | Pedersen |
| 2024/0343284 | A1 | 10/2024 | Fitzwater et al. |

FOREIGN PATENT DOCUMENTS

| | | | | |
|---|---|---|---|---|
| IN | | 210446 | 6/2009 | |
| WO | | D083472001 | 5/2014 | |
| WO | WO-2014144880 | A2 * | 9/2014 | ........... B62B 3/1492 |

OTHER PUBLICATIONS

Target shopping cart target gift card with photo of shopping cart, retrieved May 7, 2024, https://www.target.com/p/target-shopping-cart-10-target-giftcard/-/A-90247833 (Year: 2024).

Have you used Target's new wonderful shopping carts in Texas yet?, article published Aug. 22, 2023, https://knue.com/did-you-see-targets-wonderful-new-shopping-carts-have-made-it-to-texas/ (Year: 2023).

"File:Shopping Cart with Baby Seat", printed from https://commons.wikimedia.org/wiki/File:Shopping_Cart_with_Baby_Seat.jpg, publicly available at least as early as Sep. 13, 2020 (4 pages).

"Rabtrolley Plastic Trolley" printed from https://www.rabtrolley.com/?l=en, publicly available as early as Feb. 5, 2016, per the Internet Archive Wayback Machine at https://web.archive.org (3 pages).

"Safe-Dock Infant Seat Carrier", printed from https://premiercarts.com/BS_Safe-Dock.html Page, publicly available at least as early as Aug. 30, 2015 per the Internet Archive Wayback Machine at https://web.archive.org (2 pages).

"Safe-Seat, Elite Infant Seat" printed from https://premiercarts.com/BS_SS-Plus.html, publicly available as early as Jun. 16, 2013, per the Internet Archive Wayback Machine at https://web.archive.org (2 pages).

U.S. Appl. No. 18/383,834, filed Oct. 25, 2023, and claiming priority to Oct. 25, 2022 (30 pages).

U.S. Appl. No. 29/857,746, filed Oct. 25, 2022 (12 pages).

U.S. Appl. No. 29/857,751, filed Oct. 25, 2022 (20 pages).

U.S. Appl. No. 18/383,848, filed Oct. 25, 2023, and claims priority to Oct. 25, 2022 (38 pages).

U.S. Appl. No. 18/383,860, filed Oct. 25, 2023, and claiming priority to Oct. 25, 2022 (35 pages).

(56) References Cited

OTHER PUBLICATIONS

U.S. Appl. No. 18/383,870, filed Oct. 25, 2023, and claims priority to Oct. 25, 2022 and Oct. 27, 2022 (36 pages).
U.S. Appl. No. 29/857,743, filed Oct. 25, 2022 (17 pages).
U.S. Appl. No. 29/857,763, filed Oct. 25, 2022 (10 pages).
U.S. Appl. No. 29/857,771, filed Oct. 25, 2022 (10 pages).
U.S. Appl. No. 29/857,773, filed Oct. 25, 2022 (10 pages).
U.S. Appl. No. 29/857,775, filed Oct. 25, 2022 (17 pages).
U.S. Appl. No. 29/857,777, filed Oct. 25, 2022 (17 pages).
U.S. Appl. No. 29/857,778, filed Oct. 25, 2022 (19 pages).
U.S. Appl. No. 29/857,781, filed Oct. 25, 2022 (47 pages).
U.S. Appl. No. 29/857,782, filed Oct. 25, 2022 (4 pages).
Flicker Target Cart, date published Nov. 30, 2016 [online], [site visited Jul. 22, 2025]. Available from internet, URL: <https://www.flickr.com/photos/thetransitcamera/30524910294/in/photostream/> (Year: 2016).
Google About This Image /ALAMY Target Cart, date published Oct. 28, 2021 [online], [site visited Jun. 30, 2025]. Available from Internet; URL (Year: 2021).
Google About This Image / Premier Carts APFS All Polymer Large Full Size Plastic Retail Shopping Carts, date published May 30, 3030 [online], [site visited Jul. 22, 2025]. Available from internet, URL: <https://tinyurl.com/yjyedxuu> (Year: 2020).
Google About this Image/ REHABMART Accessories for Crocodile Gait Trainer, date published Oct. 2, 2021 [online], [site visited Jun. 30, 2025] Available from Internet, URL https://tinyurl.com/4x5mrb8r> (Year 2021).
Target Toy Shopping Cart, date first available Aug. 18, 2022 [online], [site visited Jun. 30, 2025], Available from internet, URL: <https://www.amazon.co.jp/-/en/Target-Toy-Shopping-Cart/dp/B07F9W1Z23> (Year: 2022).

\* cited by examiner

SHOPPING CART GATE WITH CHILD SEAT AND ASSEMBLIES THEREOF

CROSS-REFERENCE TO RELATED APPLICATIONS

This non-provisional utility application is related to and claims priority under 35 U.S.C. 119(e) to U.S. Provisional Patent Application No. 63/419,703, filed Oct. 25, 2022, which is incorporated herein by reference.

BACKGROUND OF THE INVENTION

Stores around the world maintain fleets of shopping carts to facilitate a customer's selection, transport, and purchase of goods within those stores. Over many decades, the shape and size of shopping carts have changed to meet different models of shopping. Retailers devote considerable resources to shaping a customer's experience within a retail store to make shopping easier, more comfortable, and attractive. The impact of shopping carts on that experience is often overlooked. In order to make an attractive and/or sturdy shopping cart, a shopping cart may be formed of one or more of various materials such as wire, metal, or plastic, such as a thermoplastic resin. Different cart designs make different use of these materials as designers see fit to make functional and visually appealing shopping carts.

Each individual retail store typically employs the use of a fairly large number of shopping carts to serve its shoppers. Storage of the shopping carts is not only cumbersome but can also be problematic as it can require a large amount of space. As such, any manner of storing the shopping carts that minimizes space requirements, preferably without taking a meaningful toll on the aesthetics and/or structural integrity of the shopping carts, can be beneficial. In some instances, horizontal stacking of shopping carts, in which several shopping carts are pushed one inside the other, for example, to fit at least partially within the basket of the other, to form a front-to-back stack of shopping carts having a collective footprint smaller than the same number of shopping carts would collectively have if they were not so stacked.

Still further, shopping carts are not only employed to house and transport goods for and after purchase but are often used to transport guests most precious cargo, their children. Oftentimes, shopping carts configured for horizontal stacking are also configured with child seats that collapse during stacking. However, collapsible seating can create pinch points or other areas of possible injury or discomfort for children who periodically ride in the seats when they are no longer in the collapsed position during use.

SUMMARY

A shopping cart includes a wheeled base, two support masts, a basket, and a gate. The two support masts are coupled to and extend upwardly from the wheeled base. The basket is coupled to the two support masts and extends over the wheeled base to define a compartment having a rear opening. The gate includes a primary panel and a child seat. The primary panel is rotatable between a first position, covering the rear opening, and a second position extending above the compartment. The child seat extends from a front surface of the primary panel and into the compartment when the primary panel is in the first position. The child seat comprises a bottom panel, a back, and side panels. The bottom panel and opposing side panels collectively form a child seat surround, extending from a first side of the primary panel to a second side of the primary panel. Other carts, cart assemblies, stacks of carts, gates, and associated methods are also described herein

BRIEF DESCRIPTION OF THE DRAWINGS

Embodiments of the invention will be described with respect to the figures, in which like reference numerals denote like elements, and in which.

DETAILED DESCRIPTION

The following detailed description of the invention provides example embodiments and is not intended to limit the invention or the application and uses of the invention. Furthermore, there is no intention to be bound by any theory presented in the preceding background of the invention or the following detailed description of the invention. Relational terms herein such a first, second, top, bottom, etc. may be used herein solely to distinguish one entity or action from another without necessarily requiring or implying an actual such relationship or order. Directional terminology, such as "front," "back," "leading," or trailing is used with reference to the orientation in the figure(s) being described. Any directional terminology is used for purposes of illustration and is in no way limiting. In addition, as used herein, the terms "about" or "substantially" apply to all numeric values or descriptive terms, respectively, and generally indicate a range of numbers or characteristics that one of skill in the art would consider equivalent to the recited values or terms, that is, having the same function or results.

Embodiments of the invention are directed to gate for use in a shopping cart specifically to selectively cover a rear opening to a basket of a shopping cart. The shopping cart gate of the present invention provides a single piece construction gate including a child safety seat providing a fully surrounded seat for a child such that the child is able to be safely held in the seat with little fear from pinching or other uncomfortable alternatives commonly experienced with typical child seats in shopping carts. Still further, gate of the present invention provides for one or more drink holders also integrally formed as a single piece with the primary gate panel and child safety seat, in one embodiment, further providing not only a robust holder that is less likely to degrade over time or lead to a spilt beverage, but also provides an aesthetically pleasing appearance. In some examples, strengthening flanges and/or other features are incorporated to further bolster the integrity and lifespan of the gate as described herein.

In addition, embodiments of coupling the gate to the shopping cart are described herein making use of coupling plugs installed or molded just above the rear opening of the basket and just a couple simple locking clips specifically designed for use in these circumstances. The locking clips provide for rebust rotatable coupling of gate relative to a remainder of shopping cart without the use of conventional tools and coupling devices, which leads to easier assemblies and upkeep of shopping carts, etc.

Figure 1:
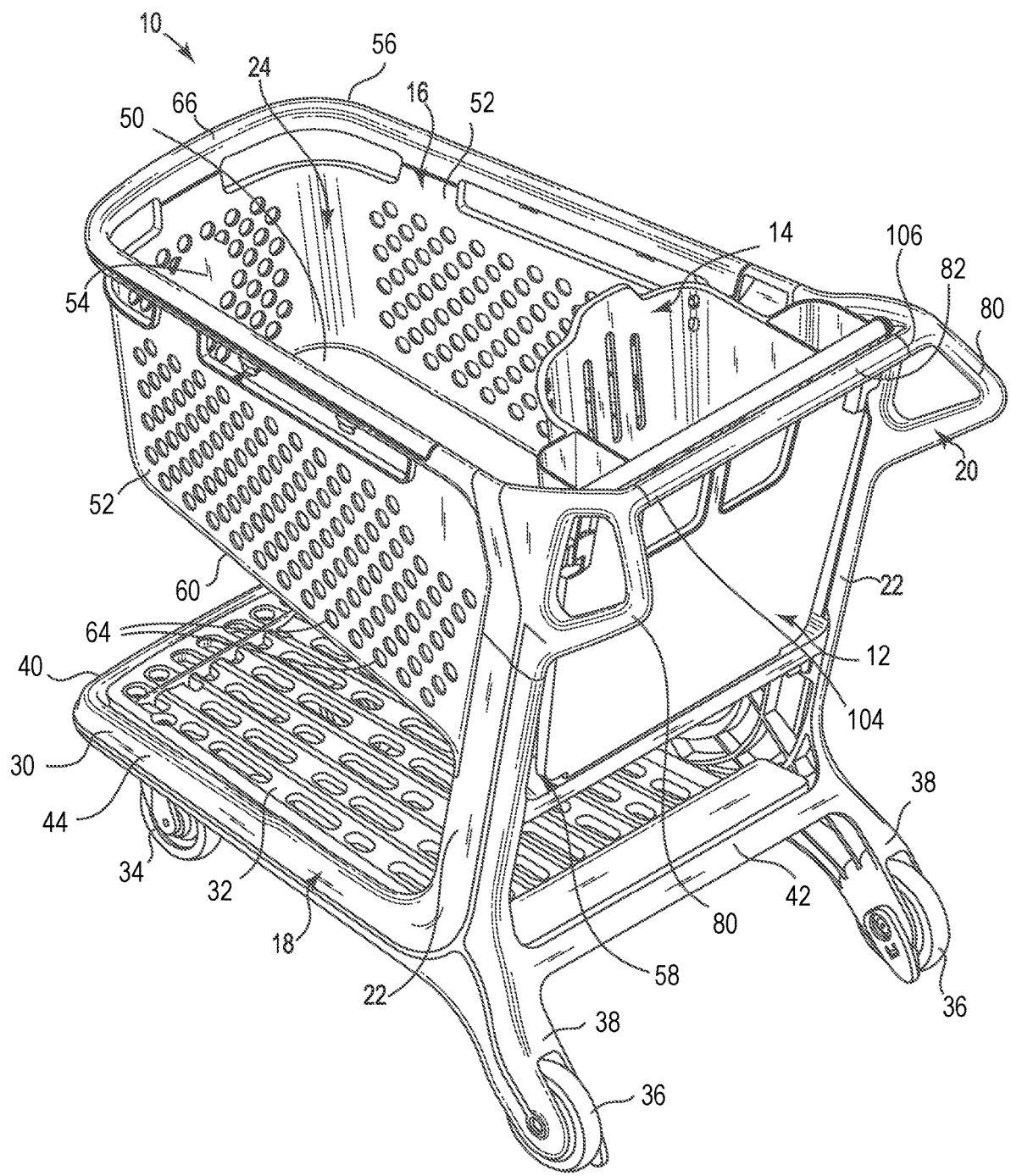
FIG. 1 is a right side and rear perspective view illustration of a shopping cart with a gate, according to an embodiment of the invention.

Turning to the figures, FIG. 1 illustrates a shopping cart 10, according to one embodiment of the invention, incorporating a gate 12 with a child safety seat 14. As illustrated, shopping cart 10 comprises a basket 16, a wheeled base 18, and a handle assembly 20. Basket 16 cantilevers forwardly over wheeled base 18 supported by two support masts 22, which each extend upwardly and, in one example, slightly rearwardly from a rear portion of wheeled base 18 to handle assembly 20. Basket 16 forms a compartment 24 open to a top of basket 16 thereof for receiving and selectively maintaining items for transport. Wheeled base 18 supports the rest of shopping cart 10 allowing shopping cart 10 to be readily pushed and/or pulled to induce movement of shopping cart 10 as desired, for instance, through a retail store or other venue. In one example, handle assembly 20 is positioned at least partially on an outside of basket 16 forming a contact surface that is easily grasped by a user to assist a user in pushing and pulling shopping cart 10 in a desired direction.

As used herein and illustrated in the drawings, the front of shopping cart 10 is the portion that generally leads shopping cart 10 during forward movement of shopping cart 10 induced by a user pushing on handle assembly 20 toward basket 16 from a position on shopping cart 10 opposite basket 16, and the rear of shopping cart 10 is the trailing portion of basket 16 our outside basket 16 opposite front of shopping cart 10 during the above-described forward movement of shopping cart 10, for example, including handle assembly 20.

In one embodiment, wheeled base 18 includes a skeleton or frame 30 supporting a tray 32, coupled to front wheels 34, and coupled to rear wheels 36 via legs 38 to allow shopping cart 10 to be pushed and/or otherwise be rolled to various locations in a retail store on front wheels 34 and rear wheels 36. More specifically, in one embodiment, frame 30 forms a closed shape, such as a quadrilateral having a front cross member 40, a rear cross member 42, and opposing side struts 44 each extending between front cross member 40 and rear cross member 42.

In one embodiment, basket 16 includes a bottom panel 50, side panels 52, and a front panel 54 and may further define an open top or mouth 56 of basket 16 and/or a rear open side 58 of basket 16. For example, bottom panel 50 forms a bottom shape of shopping cart 10 and a bottom perimeter of compartment 24. In one example, bottom panel 50 is tapered long side edge thereof such that bottom panel is formed in a frustro-triangular shape although other shapes of bottom panel 50 are also contemplated. Basket 16 maybe be formed as several pieces coupled together or, as shown in the figures, as a single, unitary molded member.

Each of side panels 52 is generally rectangular or otherwise generally quadrilateral in shape, in one example, each extending from an opposite side edge of bottom panel 50 upwardly to define the side boundaries of compartment 24. Front panel 54, which may be any suitable shape such as a rectangular shape, extending upwardly from a front edge of bottom panel 50 and between front edges of each of side panels 52. In this manner, each of side panels 52 and front panel 54 define a bottom edge 60 thereof and extend upwardly from the corresponding bottom edge 50 to a corresponding upper edge 62, opposite bottom panel 50 and the corresponding bottom edge 50.

Each of bottom panel 50, side panels 52, and front panel 54 may be continuously formed between its bottom edge 60 and upper edge 62 and/or may be discontinuously formed in a suitable manner, for example, in a manner including a plurality of apertures 64 formed therein. In one example, apertures 64 are sized, shaped, and spaced in a manner that does not encourage items of typical size to fall through the apertures 64, but that decreases the amount of plastic or other moldable material, wired material, or other material needed to define bottom panel 50, side panels 52, and/or front panel 54, as will be apparent to those of skill in the art upon reading this application.

In one example, each of bottom panel 50, side panels 52, and front panel 54 are one of substantially planar and/or just slightly flexed in a convex manner relative to compartment 24. Basket 16 may transition in an abrupt sharp corner manner between bottom panel 50 and side panels 52 and/or front panel 54 and/or between front panel 54 and each of side panels 52 or may transition in a curvilinear, smooth manner, e.g., as shown in the figures. In this manner, bottom panel 50, side panels 52, and front panel 54 not only substantially define basket 16, but also compartment 24 therebetween such that compartment 24 is open at a top or mouth 56 of basket 16 and/or at a rear side 58 opposite front panel 54. In one example, shopping cart 10 additionally includes a perimeter frame or cap 66 extending about mouth 56 of basket 16, covering top edges 52 of side panels 52 and front panel 54. In one example, perimeter frame 66 of basket 16 is substantially continuous about mouth 56.

In one embodiment, basket 16 is configured to define a rear open side 58 opposite front panel 51. Rear open side 58 is configured to be selectively covered by gate 12, which is rotatable between an open position, leaving rear open side 58 uncovered, and a closed position, in which rear open side 58 is covered, as will be described in additional detail below.

In one embodiment, handle assembly 20 is mounted at a rear and upper portion of basket 16, for example, behind rear open side 58, to facilitate maneuvering cart 10. As shown in FIGS. 1, in one embodiment, rear handle assembly 20 comprises two side handles 80 and a laterally extending handle 82 extending between the two side handles 80. Each of the two side handles 80 rearwardly extends from one or both of support masts 22 and/or basket 16. Each of laterally extending handle 82 and the two side handles 80 provide easily grasped surfaces to facilitate the ease in which a user can push, pull, and/or otherwise manipulate movement of shopping cart 10 via rotation and/or swiveling of wheels 34 and 36 of wheeled base 18.

More specifically, in one example, each of the two side handles 80 includes a mast coupling end 84 and extends upwardly therefrom to a top surface 86. Mast coupling end 84 is secured to and caps a corresponding one of support masts 22, in one example, capping off support mast 22 to secure basket 16 thereto. A front side 88 of each side handle 80 is posited adjacent basket 16, in one embodiment, with side handle 80 extending rearwardly therefrom to define a grasping zone 90 for user to interact with and grasp. In one example, grasping zone 90 is a closed shaped or loop design, while, in other embodiments, grasping zone 90 is an open shape having suitable zone to permit a user to easily grasp lengths thereof.

In one example, side handle 80 defines a peak 92 area and near this peak 92 a coupling post 94 is defined and extends inwardly toward the other of the two side handles 80 from an interior-facing surface 96 thereof. Coupling post 94 is sized and shaped to receive lateral extending handle 82, in one embodiment. For example, coupling post 94 includes a collar 100 extending from interior-facing surface 96 and has an outside diameter substantially identical to laterally extending handle 82. A protruding shaft 102 extends from an end of collar 100 opposite interior facing surface 96 further inwardly toward the other side handle 80 with an outside diameter just smaller than an interior diameter of laterally extending handle 82. In this manner, a first end 104 of laterally extending handle 82 is slide onto a first one of protruding shaft 102, and a second end 106 of laterally extending handle 82 is slide onto a second one of protruding shaft 102 to couple laterally extending handle 82 to the two side handles 80. Since collar 100 is formed with an outer diameter substantially identical to the outer diameter of laterally extending handle 82, a smooth and continuous handle assembly 20 is presented to the user (not shown).

Shopping cart 10 includes coupling plug 110 extending from interior facing surface 96 in a substantially parallel direction to shaft 102, spaced just forward of shaft 102, to a free end 112 opposite interior face surfaced 96. A second coupling plug 110 is positioned on the opposite side handle 80 at an equal level and front-to-back direction as compared to the opposing coupling plug 110. The pair of coupling plug 110 are configured to receive gate 12 as will be further described below. For example, an outside perimeter 114 of coupling plug 110 is sized and shaped to fit within and a corresponding portion of gate 12. Coupling plug 110 is one of configured to allow gate rotation about coupling plug 110 and/or is rotatable about its coupling with side handle 80 such that coupling plug itself rotates about is coupling with side handle 80.

In one embodiment, each of handle assembly 20, basket 16, and wheeled base 18 are separately made exclusively of a plastic or other moldable material. This arrangement enables a lightweight cart while providing numerous structural, performance, and ergonomic functions. In another embodiment, one or more of handle, basket 16, base 18, or additional components of shopping cart 10 is/are made of a material other than a plastic material, such as metal or other suitable materials as will be apparent to those of skill in the art. In one embodiment, each of handle assembly 20, basket 16, and base 18 is made from the same one or different ones of a nylon material, a high-density polyethylene (HDPE) material, or other moldable materials or mixtures of moldable materials and/or other non-moldable materials. Still further, use of wire, metal, or any other materials to completely or partially form any one or more of handle assembly 20, basket 15, and base 18 are also contemplated as will also be apparent to those of skill in the art upon reading this application.

FIGS. 3-9 illustrate one embodiment of gate 12 with child seat 14, according to the present invention. In one example, shopping cart 10 includes gate 12 rotatably coupled to one of support masts 22, basket 16, rear handle assembly 20, or other portion of shopping cart 10. Gate 12 is, in one embodiment, positioned at a rear end of basket 16, for example, selectively closing off an otherwise open rear end of basket 16, and seat 14 is provided for, in one example, selectively seating a small child and/or selectively receiving smaller items, such as a user's bag or purse, small items for purchase, etc. As illustrated, gate 12 is rotatably coupled with a remainder of shopping cart 10 in a manner allowing gate 12 to rotate about the coupling to selectively, substantially cover a rear of compartment 24 and/or to extend into and/or above rear compartment 24. As illustrated, gate 12 with child seat 14 is injection molded as a single piece of plastic or other moldable material, such as a nylon material, a high-density polyethylene (HDPE) material, or other suitable moldable material or mixtures thereof. The single piece molded gate 12 with child seat 14 provides a robust seat for a child while eliminating hinge and fold locations that are typically found in foldable child safety seats that create pinch points or other areas that may harm a child sitting in such seats.

In one example, gate 12 is substantially polygonal with a slightly smaller width at the bottom thereof or otherwise suitably sized and shaped to fit within and largely cover an entirety of rear open side 58 of basket 16. Gate 12 includes a primary panel 120 having a front surface 122 and a rear surface 124 facing opposite front surface 122. Primary panel 120 defines a top edge 130, a bottom edge 132 opposite top edge 130, and opposite side edges 134 each extending between top edge 130 and bottom edge 132. In one example, one or more strengthening flanges 142 are defined along each of bottom edge 132 and/or opposing side edges 134 extending in a direction substantially perpendicularly to the planar extension of gate 12 between opposing side edges 134 to provide additional strength and rigidity to primary panel 120 of gate 12. A tubular channel 136 extends across a substantial entirety of top edge 120 and is open at least at each of a first end 138 and a second end 140, opposite first end 138, thereof. The open area at each of first end 138 and second end 140 is sized and shaped to receive coupling plug 110.

A locking chamber 144 may be formed just below first end 138 of tubular channel 136 and similarly repeated at second end 140. Locking chamber 144 is formed adjacent one of opposing side edges 134 on rear side of primary wall of gate 12. Locking chamber 144 is defined by an inside facing wall 148 the closest side edge 134, a back wall 150 extending from the inside facing wall 148 back to an exterior edge 146 even with opposite side edge 134 opposite primary wall of gate 12. A bottom wall 152 caps locking chamber 144 between primary wall of gate 12, inside facing wall 148, and back wall 150 opposite tubular channel 136. In one embodiment, a width of locking chamber 144 defined between primary panel 120 of gate 12 and back wall 150 is substantially equal to or just slightly less than an outer diameter of coupling plug 110.

An opening 153 to locking chamber 144 is defined in back wall 150 near bottom wall 152, in one embodiment. Opening 153 is sized to have a length extending inwardly from exterior edge 146 a distance equal at least to a length coupling plug 110 extends inward from interior facing surface 96 and a height at least equal to an outer diameter of coupling plug 110. In this manner, opening 153 is sized and shaped to permit coupling plug 110 to move into and out of locking chamber 144.

In one embodiment, an interior wall 154 is formed to be substantially parallel to inside facing wall 148 and is spaced between interior wall 154 and exterior edge 146, for example, spaced from exterior edge 146 a distance equal to at least a length coupling plug 110 extends inward from interior facing surface 96. Interior wall 154 defines a dividing slot 156 extending from a bottom thereof upwardly toward tubular channel 136. Interior wall 154 with dividing slot 156 is sized and shaped to receive a portion of a locking clip 160 as will be further described below. Also configured to facilitate receipt of locking clip 160, in one embodiment, back wall 150 includes locking apertures 158 therein configured to selectively receive corresponding portions of locking clip 160 as will also be described in additional detail below.

In one example, gate 12 includes additionally coupling and/or functional features. For instance, gate 12 includes two or more bottom tabs 162 extending downwardly from bottom edge 132 and are each configured to fit within corresponding indentations 166 in bottom panel 50 of basket 16 to help secure gate 12 in place covering rear open side 58. In one embodiment, indentations 166 are formed to interact with tabs 162 to prevent movement or, more particularly, rotation of gate 12 rearwardly out of rear open side 58 while allowing forward rotation of gate 12 out of rear open side 58, for instance, during horizontal stacking as will be further described below.

Gate 12 includes one or two leg apertures 164 near a top center of gate 12 each sized and shaped to easily and comfortably receive a leg or two of a child. Seat 14 is coupled to a front of gate 12 aligned with the one or more leg apertures 164 such that a child sitting in seat 14 is aligned to comfortably use leg apertures 164 to fit his/her legs therethrough, as will be apparent to those of skill in the art upon reading the present application.

In one embodiment, child seat 14 includes a bottom panel 170, a back wall 172, opposing side walls 174. Bottom panel 170 is generally rectangular defining a front edge 176, a rear edge 178 opposite front edge 176, and opposing side edges extending between front edge 276 and rear edge1 178 to form bottom panel 170 in a largely rectangular shape. Back wall 172 defines a bottom edge 184 adjacent rear edge 178 of bottom panel 170. Back wall 172 generally extends upwardly from bottom edge 184 to top edge 186, which may be generally linear, curvilinear, and/or include a middle back support extension 188 extending further away from bottom edge 184 than a remainder of top edge 186, as will be apparent to those of skill in the art upon reading the present application. In one example, back wall 172 extends laterally between two opposing side edges 190, which each extend between bottom edge 184 and top edge 186. Notably, as used herein, "edge" should be broadly construed to be the edge of a portion of feature being described and not narrowly to require a termination or cut boundary. For example, bottom edge 184 of back wall 172 abuts rear edge 178 of bottom panel 170 forming a curvilinear intersection between back wall 172 and bottom panel 170 without any cut or terminal feature.

Each opposing sidewalls 174 extends from a different one of opposing side edges 190 forwardly to a back surface of gate 12, that is, a front edge 198 of the corresponding sidewall 174, such that each of opposing sidewalls 174 is positioned on a different side of leg apertures 164, in one embodiment. Each opposing sidewall 174 further extends between top edge 194 and a bottom edge 192 thereof, which is adjacent bottom panel 170, in one example. In one instance, top edge 194 aligns and/or relatively smoothly transitions to top edge 186 of back wall 172. In this manner, child seat 14 is completely enclosed between gate 12 and back wall 172 and opposing sidewalls 174 providing a safe enclosing for a child to sit within. Otherwise stated, in one example, back wall 172 and opposing side walls 174 collectively form a continuous child seat surround, extending from one side of front surface 122 of primary panel 120 to the other side of front surface 122 of primary panel 120, such as one side of leg apertures 164 to the other side of leg apertures 164. In some instances, a strengthening top flange 206 is formed continuously along top edges 186 and 194 to provide additional strength and rigidity to back wall 172 and opposing side walls 174 of child seat 14. In one embodiment, back wall 172 forms curvilinear intersection lines 200 with each of back wall 172 and opposing side walls 174 and/or back wall 172 forms curvilinear intersection lines 200 with each of opposing sidewalls 174 to form child seat 14 without any sharp corners, etc.

In one example, back wall 172 may include back apertures 202 of any suitable size and shape to save on material needed to form child seat 14 and to encourage air flow through child seat 14. Similarly, in one embodiment, bottom panel 170 may include any suitably shaped bottom apertures 182. Bottom apertures 182 may additionally serve as drainage in the case that any liquid or other items are spilled within child seat 14 and/or precipitation may fail in child seat 14 if shopping cart 10 is left outside during inclement weather. In one embodiment, additional apertures 204 are formed at intersection lines 200 between back wall 172 and opposing side walls 174 and are configured to receive a safety belt or other accessories as will be apparent to those of skill in the art upon reading the present application.

In one embodiment, gate 12 includes cup holders 208 integrally formed with each of primary panel 120 and child seat 14, for example, one cup holder 208 on either side of child seat 14 adjacent front surface 124 of primary panel 120. Cup holders 208 may be injection molded as a single piece of material with primary panel 102 and child seat 14. More specifically, in the illustrated embodiment, one of cup holder 208 includes a bottom wall 210, a front wall 212, and a side wall 214. Bottom wall 210 defines a front edge 216 adjacent front surface front surface 122 of primary panel 120 and extends rearwardly therefrom to a rear edge 218 adjacent front wall 212. Bottom wall 210 further extends from one or opposing side edges 220 adjacent one of opposing sidewalls 174 of child seat 14, for example, laterally outwardly to the opposite one of opposing side edges 220 adjacent side wall 214. Bottom wall 210 may include one or more bottom apertures 222 to save material and facilitate drainage therefrom.

Front wall 212 extends upwardly from its bottom edge 224 at bottom wall 210 upwardly to an opposite top edge 226 and laterally between opposing side edges 228 at each of the adjacent one of opposing sidewalls of child seat 14 and side wall 214. Side wall 214 extends upwardly from its bottom edge 230 at bottom wall 210 to an opposite top edge 232 and longitudinally from its front edge 236 adjacent rear surface. In one embodiment, cupholder 208 is configured such that even when gate 12 is angled in place in shopping cart 10, cupholder 208, namely front wall 212 is maintained substantially vertically to hold any beverage or other item temporarily stored therein substantially upright, as will be apparent to those of skill in the art upon reading this application. In one example, each of cupholders 208 is substantially symmetrical the other one of cupholders 208. Intersection lines 238 between parts of cupholders 208, for example, between bottom wall 210 and each of front wall and side wall, between front wall and side wall, etc. can take on any suitable transition, such as a curvilinear transition as illustrated in the drawings of this application.

Figure 2:
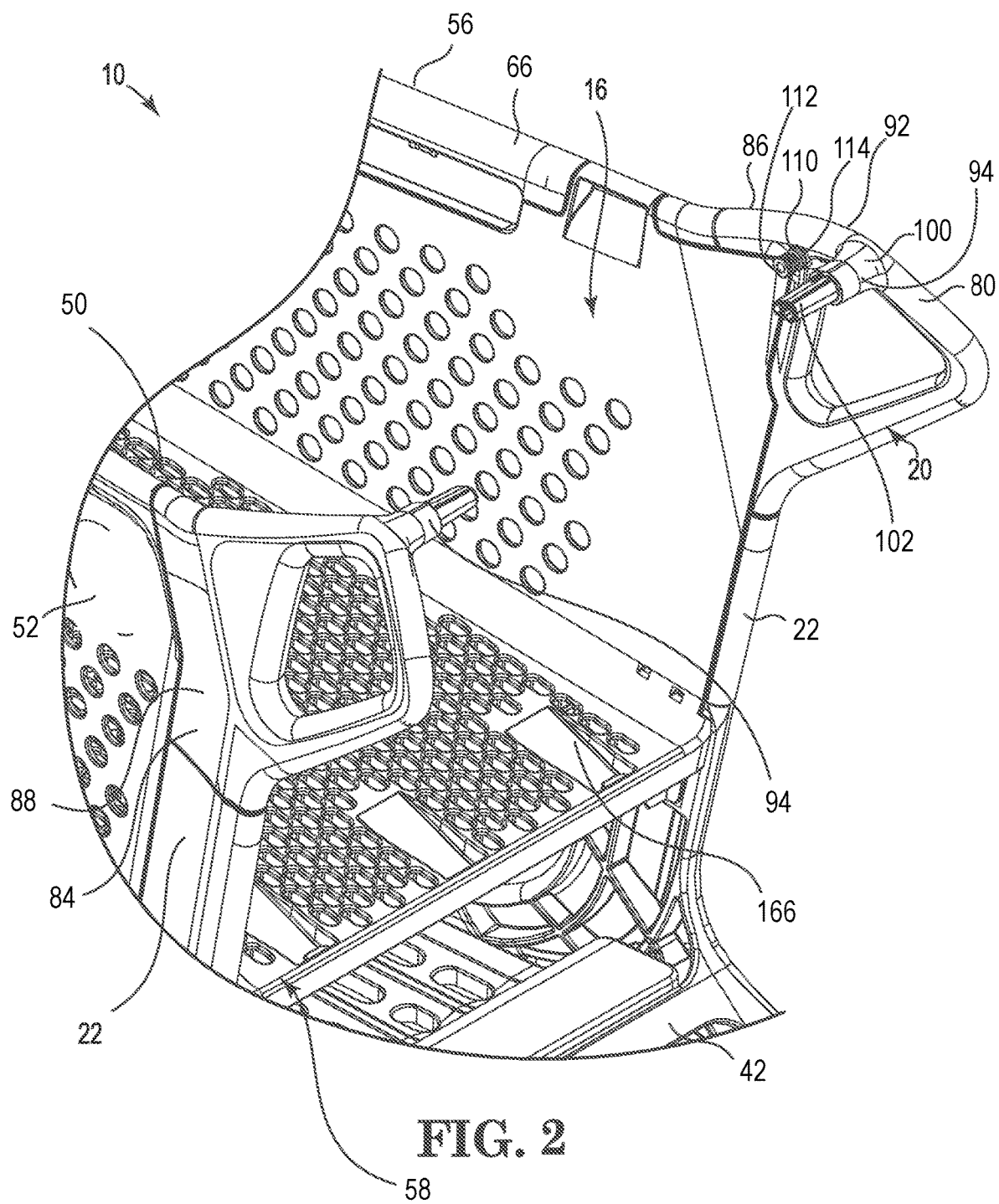
FIG. 2 is an enlarged partial, right side and rear perspective view illustration of a shopping cart with a gate removed, according to an embodiment of the invention.
Figure 3:
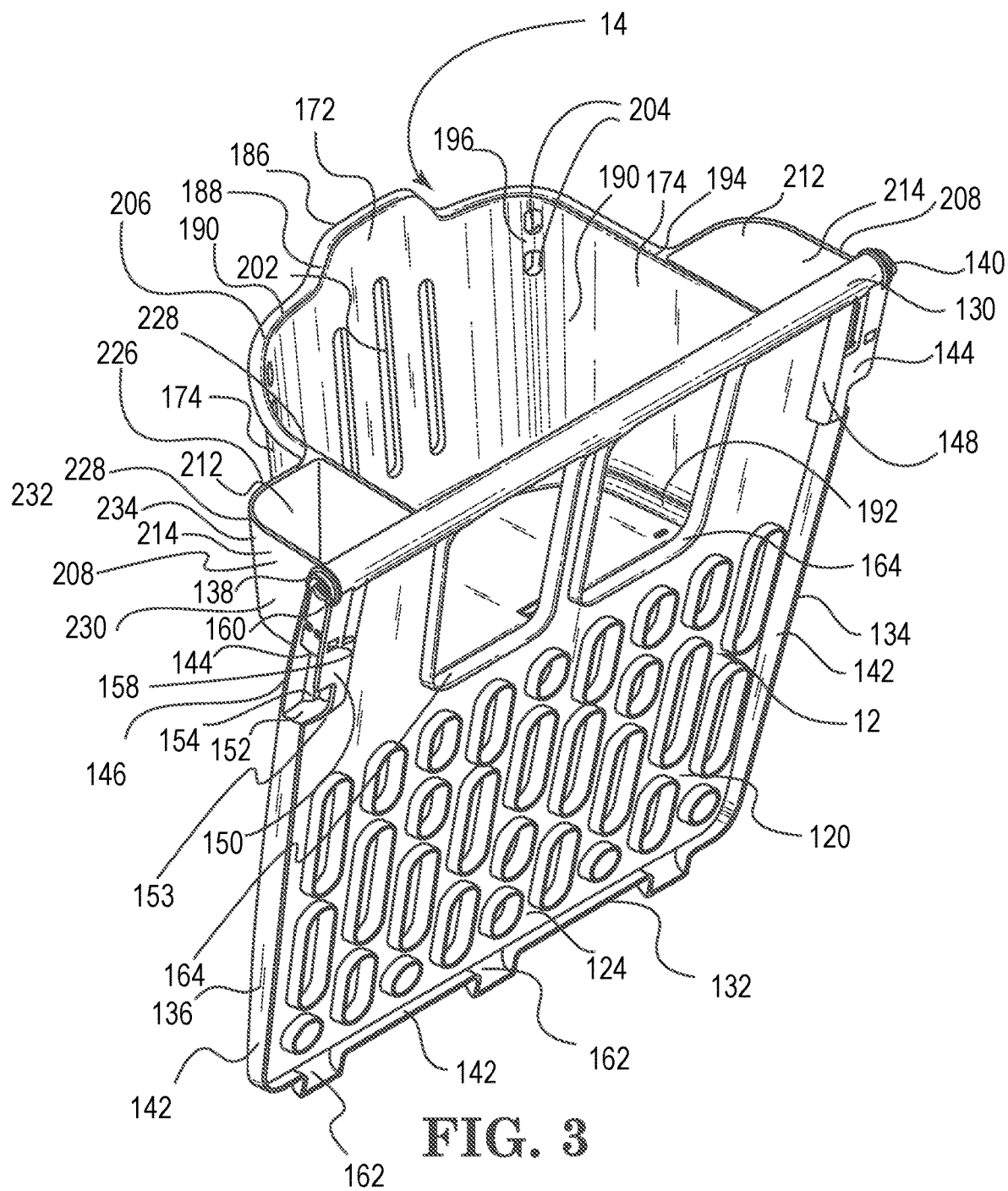
FIG. 3 is a right side and rear perspective view illustration of a gate, according to an embodiment of the invention.
Figure 4:
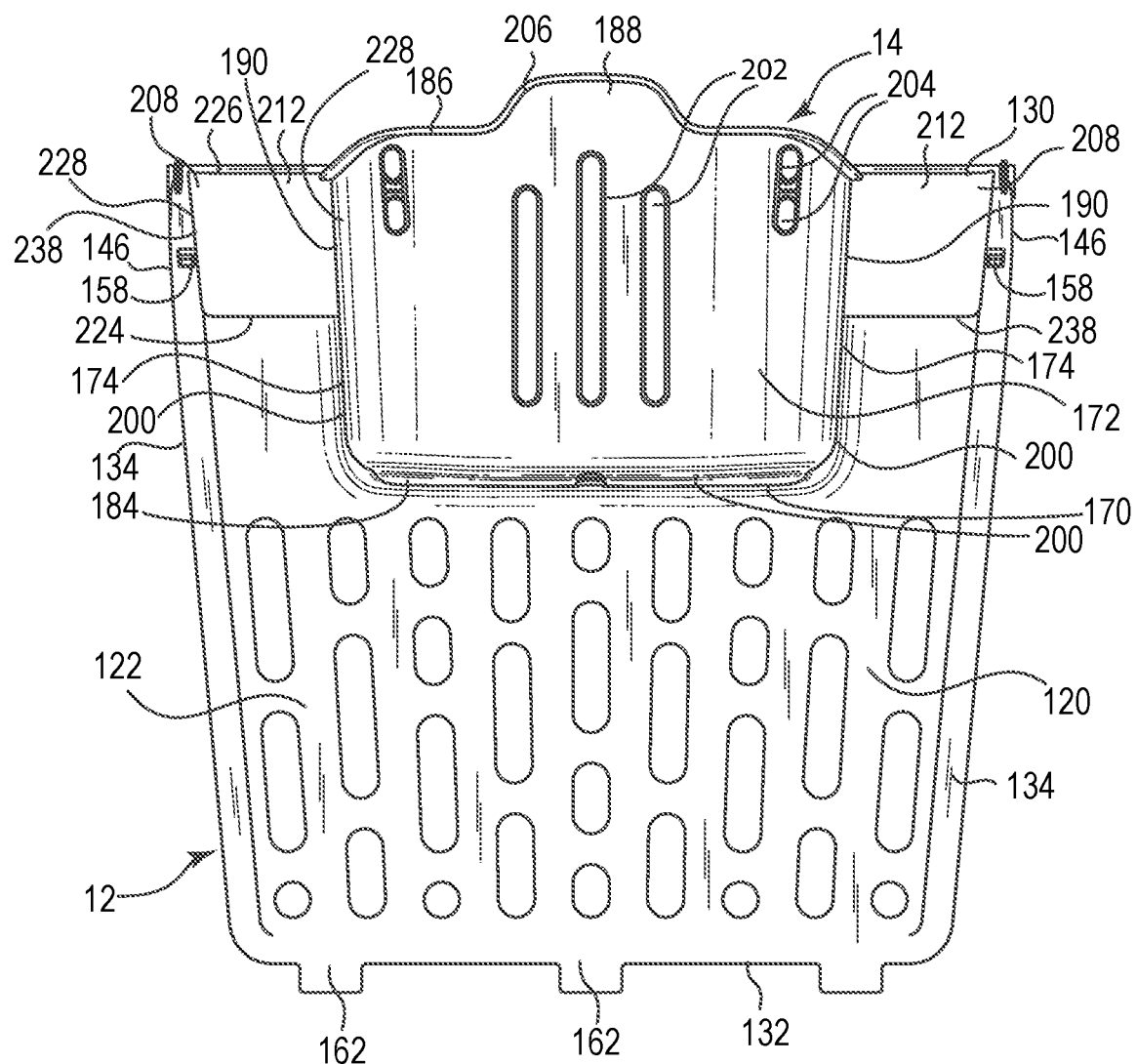
FIG. 4 is a front view illustration of the gate of FIG. 3, according to an embodiment of the invention.
Figure 5:
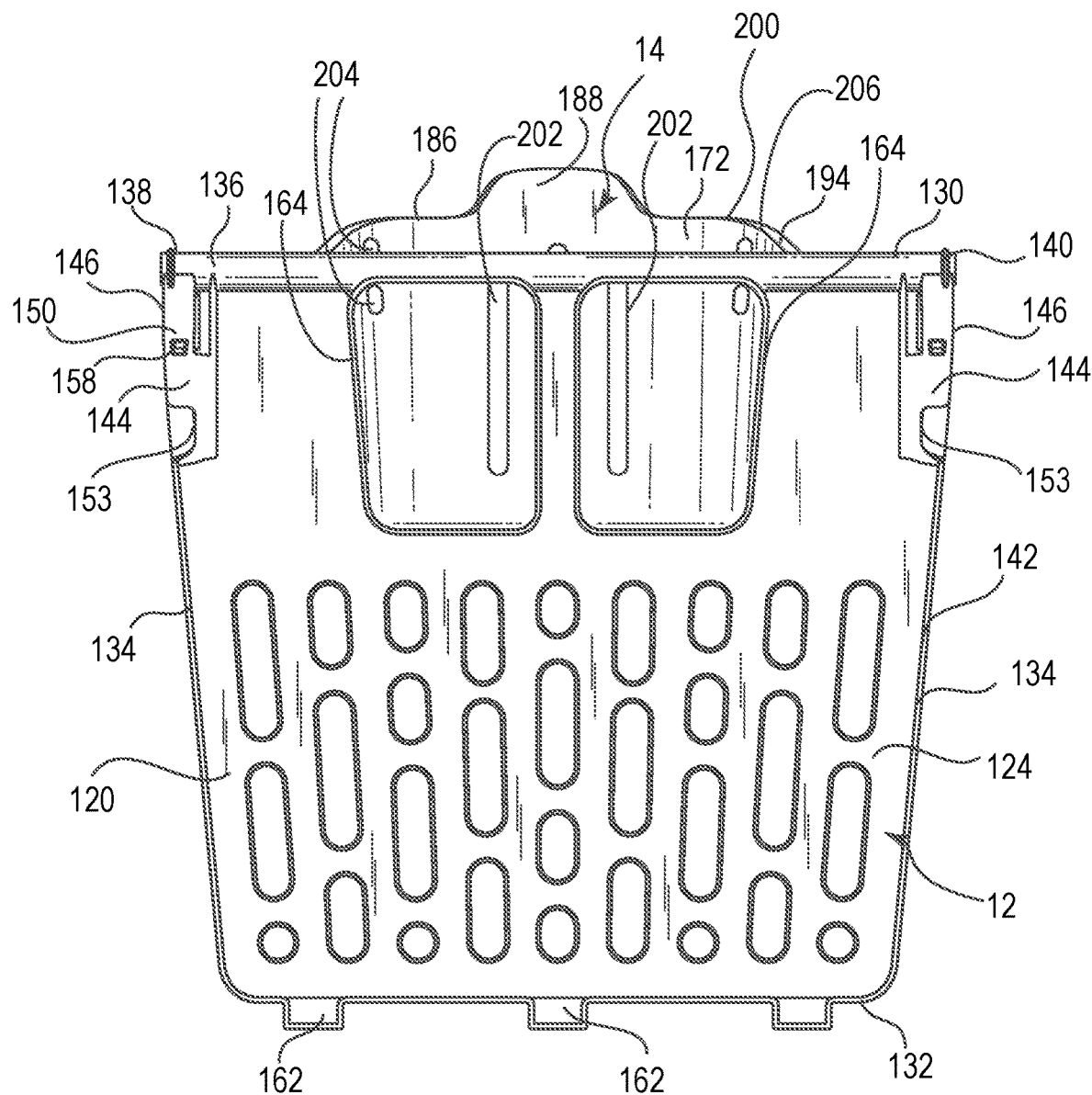
FIG. 5 is a rear view illustration of the gate of FIG. 3, according to an embodiment of the invention.
Figure 6:
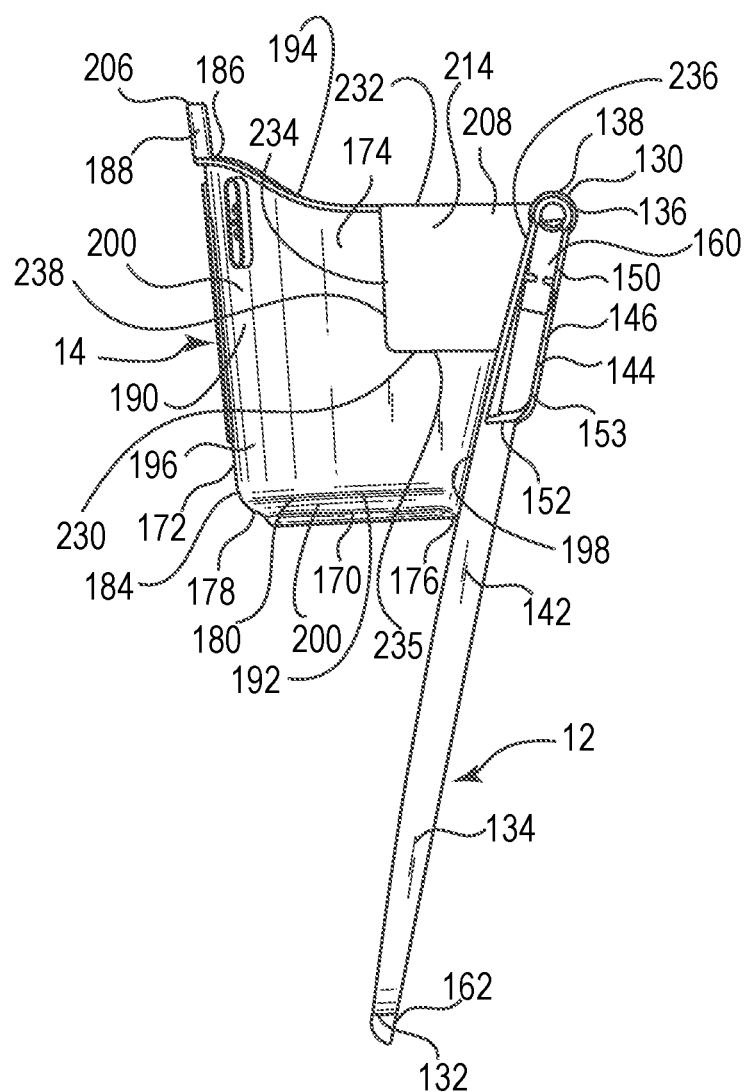
FIG. 6 is a right side view illustration of the gate of FIG. 3, according to an embodiment of the invention.
Figure 7:
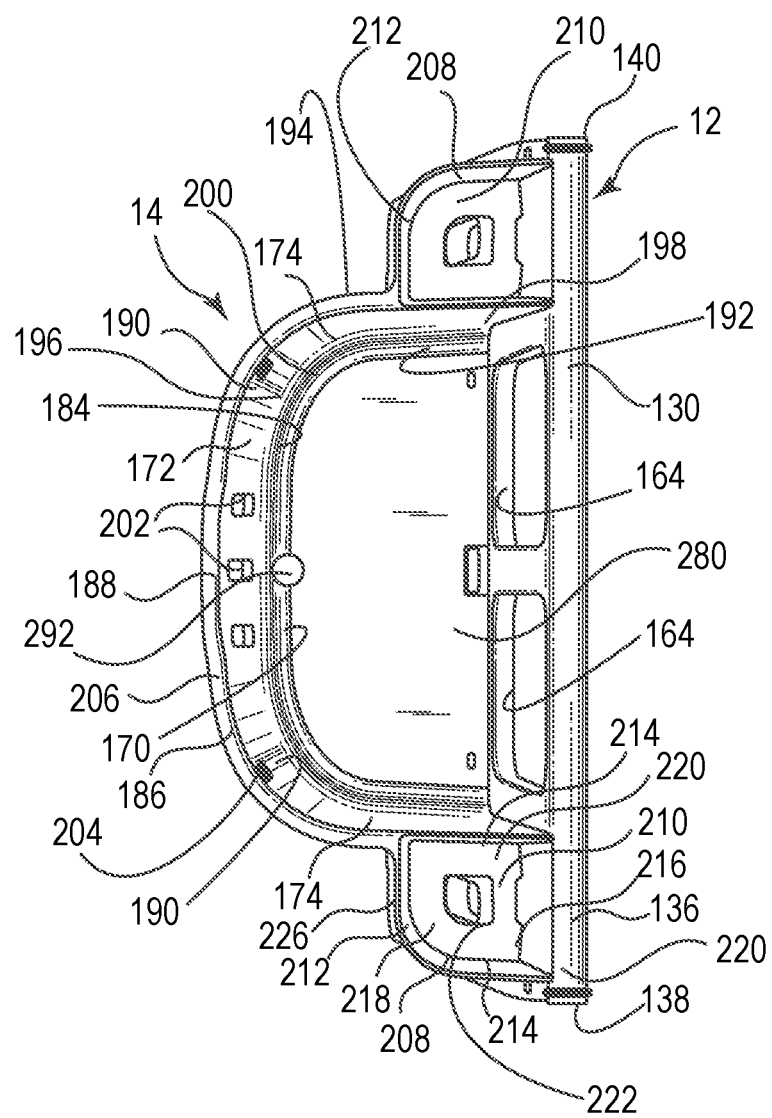
FIG. 7 is a top view illustration of the gate of FIG. 3, according to an embodiment of the invention.
Figure 8:
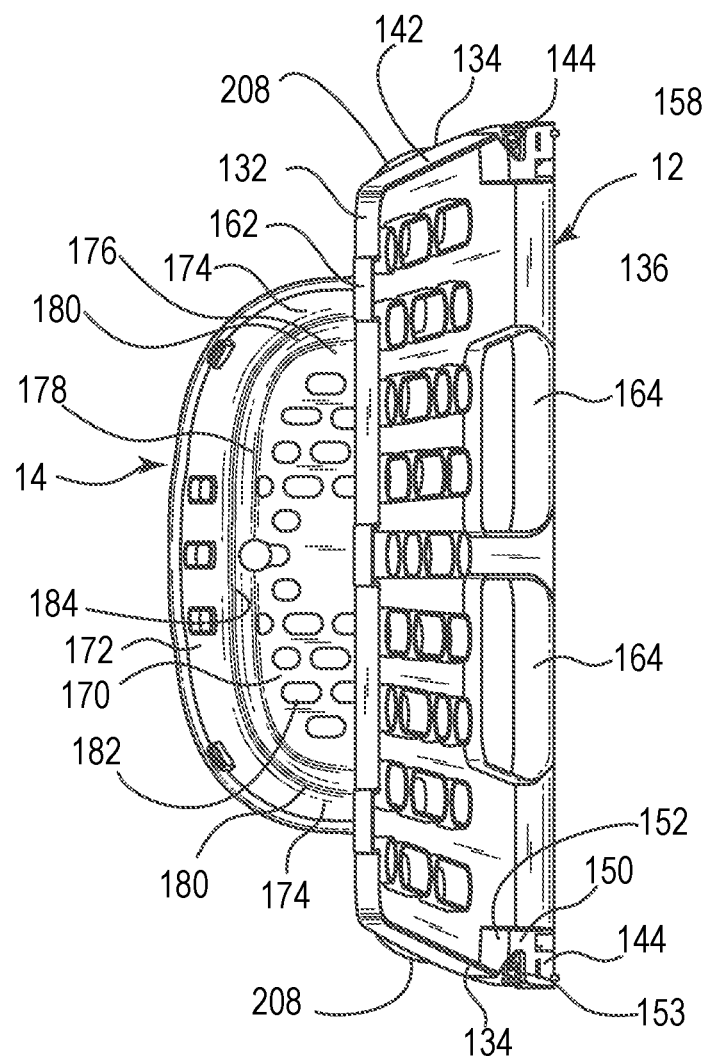
FIG. 8 is a bottom view illustration of the gate of FIG. 3, according to an embodiment of the invention.
Figure 9:
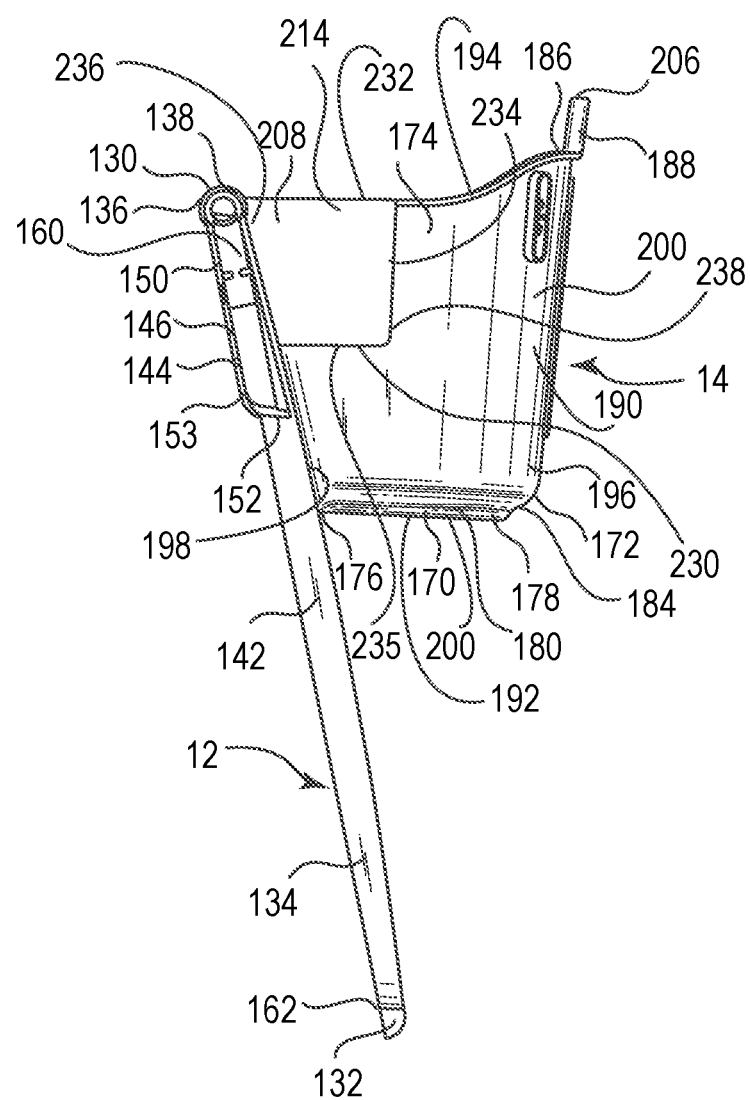
FIG. 9 is a left side view illustration of the gate of FIG. 3, according to an embodiment of the invention.
Figure 10:
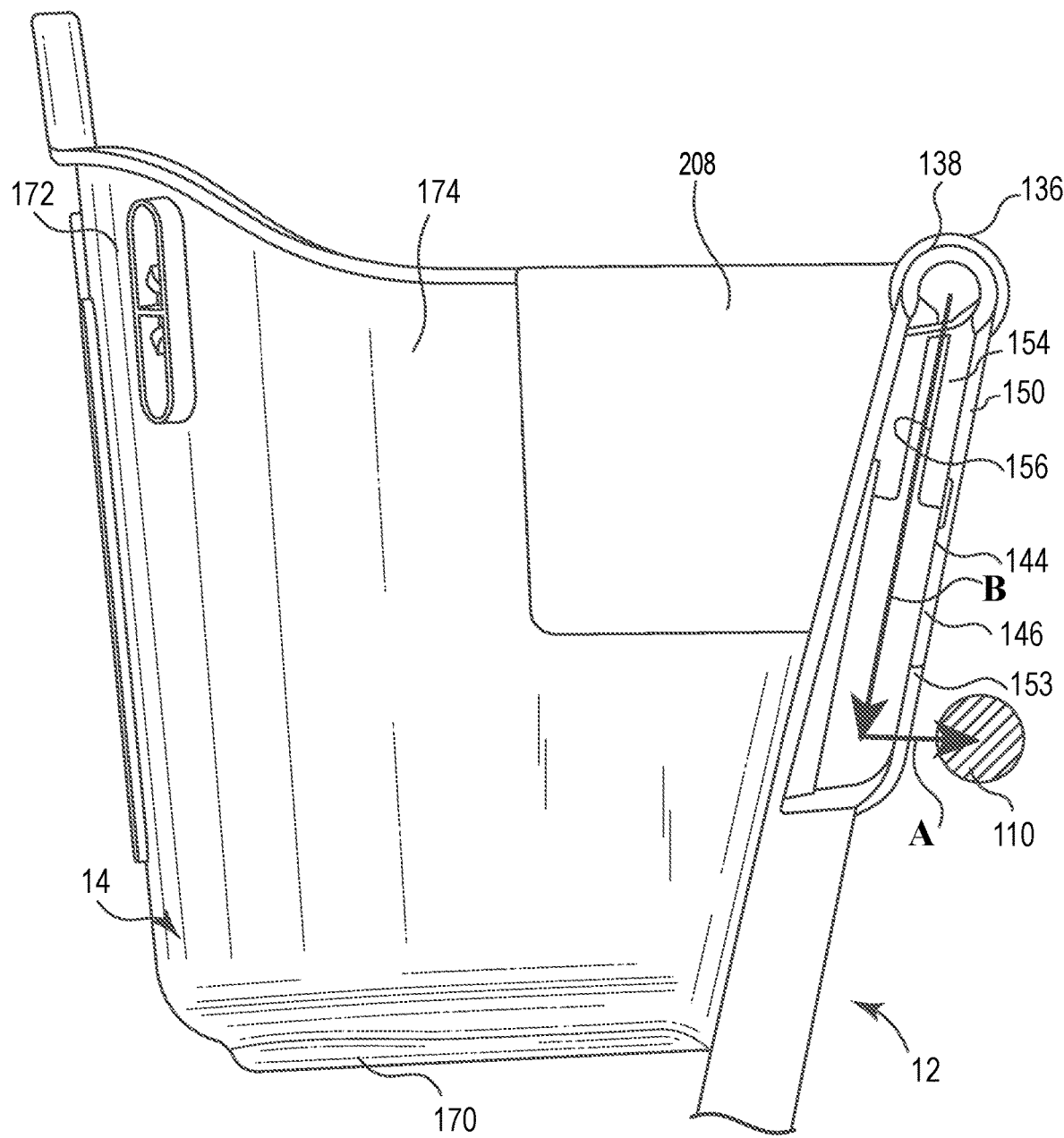
FIG. 10 is an enlarged, partial right side view, schematic illustration of the gate of FIG. 3 with a coupling plug of the shopping cart of FIG. 1 during assembly, according to an embodiment of the invention.

Gate 12 is coupled to shopping cart 10 to rotate between an open and closed position relative to covering rear open side 58 in any suitable manner, such as via coupling plug 110. More specifically, collectively referring to FIGS. 2 and 10, gate 12 is coupled by aligning opening 153 in back wall 150 of locking chamber 144 on both sides of gate 12 with the two oppositely positioned coupling plugs 110 on shopping cart 10 as best shown in FIG. 10. Notably, in FIG. 10 only coupling plug 110 is shown from the remainder of shopping cart 10 for illustrative purposes with the remainder of shopping cart being visible in FIG. 2 and other Figures for additional context.

Figure 13:
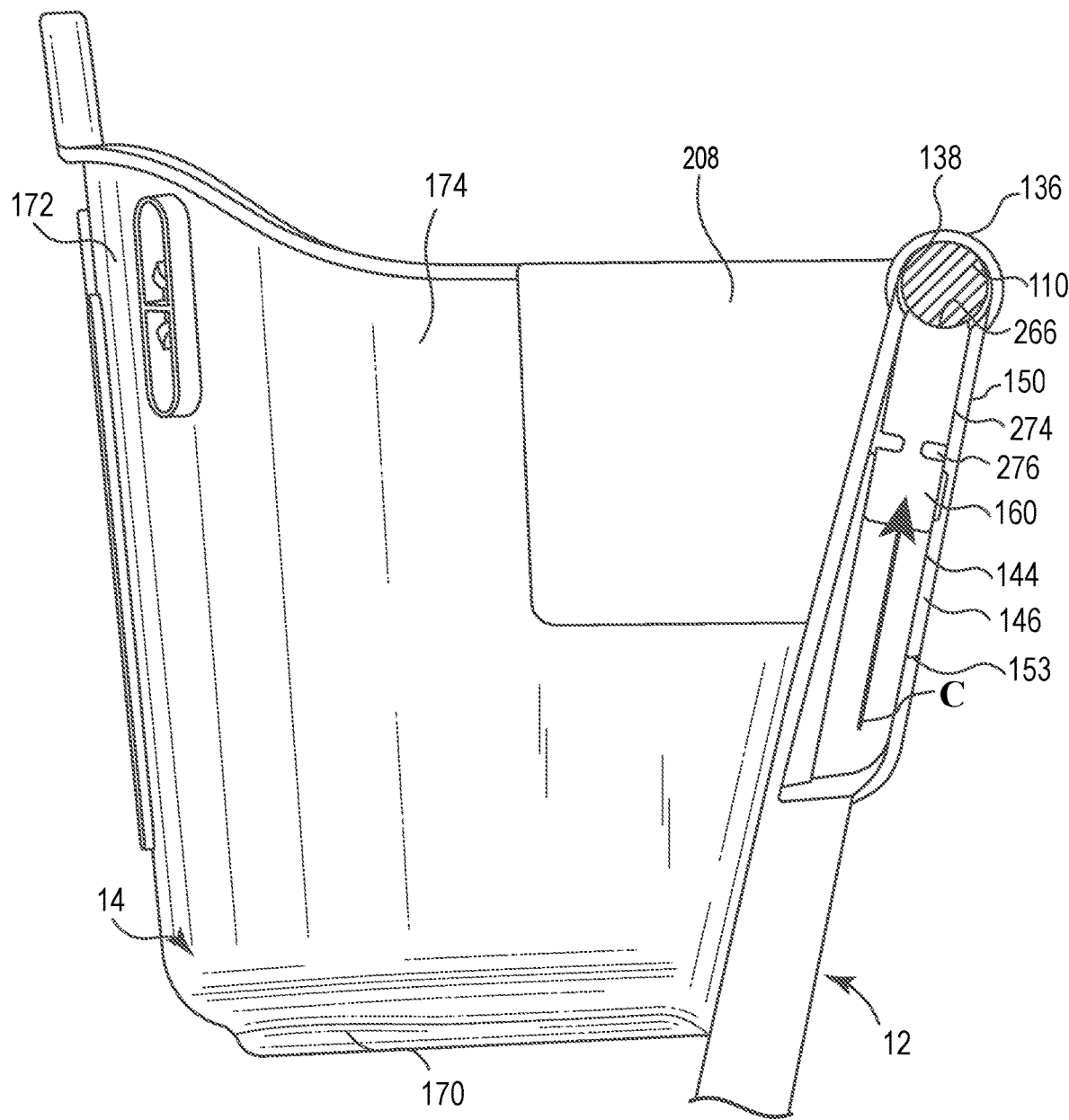
FIG. 13 is an enlarged, partial right side view, schematic illustration of the gate of FIG. 3 with a coupling plug and locking clip of the shopping cart of FIG. 1, according to an embodiment of the invention.

Once properly aligned with coupling plug 110, gate 12 is moved rearwardly as generally shown by arrow A to move locking chamber 144 into position using opening 153. After coupling plugs 110 are in place in locking chamber 144, then gate 12 is moved or pushed downwardly onto the two coupling plugs 110 as generally shown by arrow B in FIG. 10 until each coupling plug 100 is seated in the corresponding one of first open end 138 and second open end 140 of tubular channel 136, as illustrated in FIG. 13, for example. When so seated, gate 12 is configured to rotate about an axis running through the center of each of coupling plugs 110 as will be apparent to those of skill in the art upon reading the present application. In one embodiment, locking clips 160 are additionally used to secure gate 12 in place on coupling plugs 110.

Figure 11:
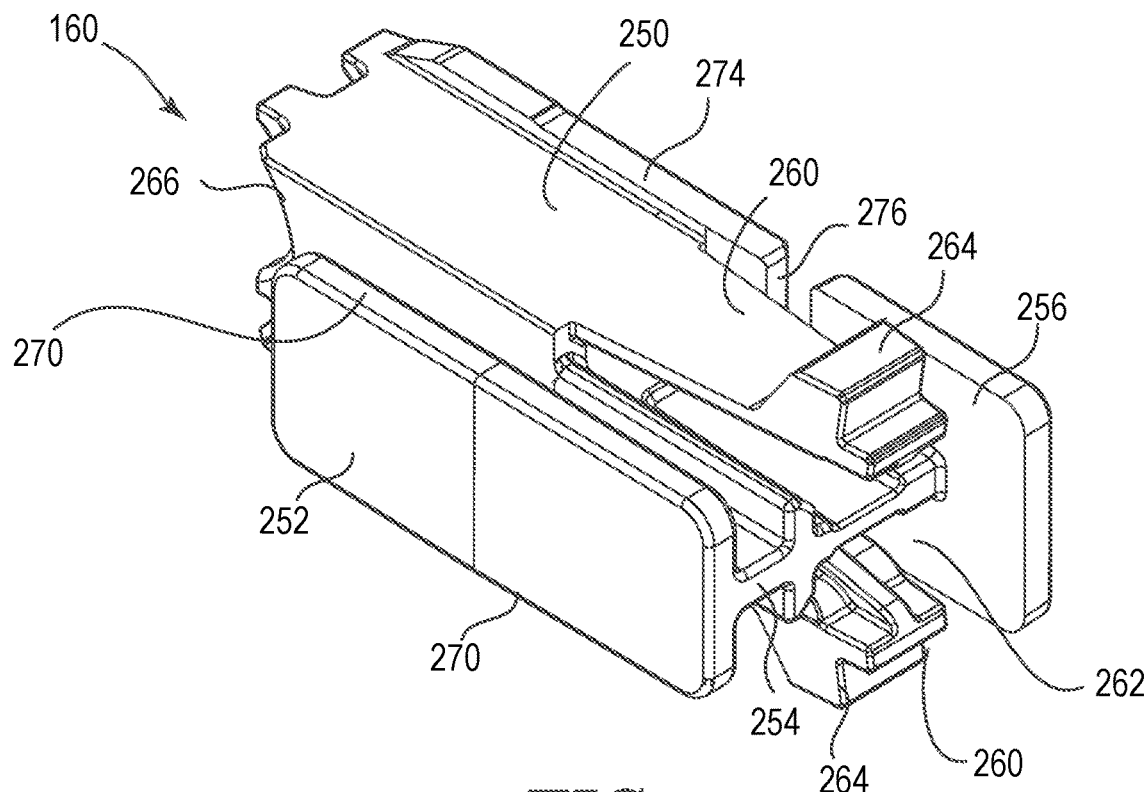
FIG. 11 is a perspective view illustration of a locking clip of the shopping cart of FIG. 1, according to an embodiment of the invention.
Figure 12:
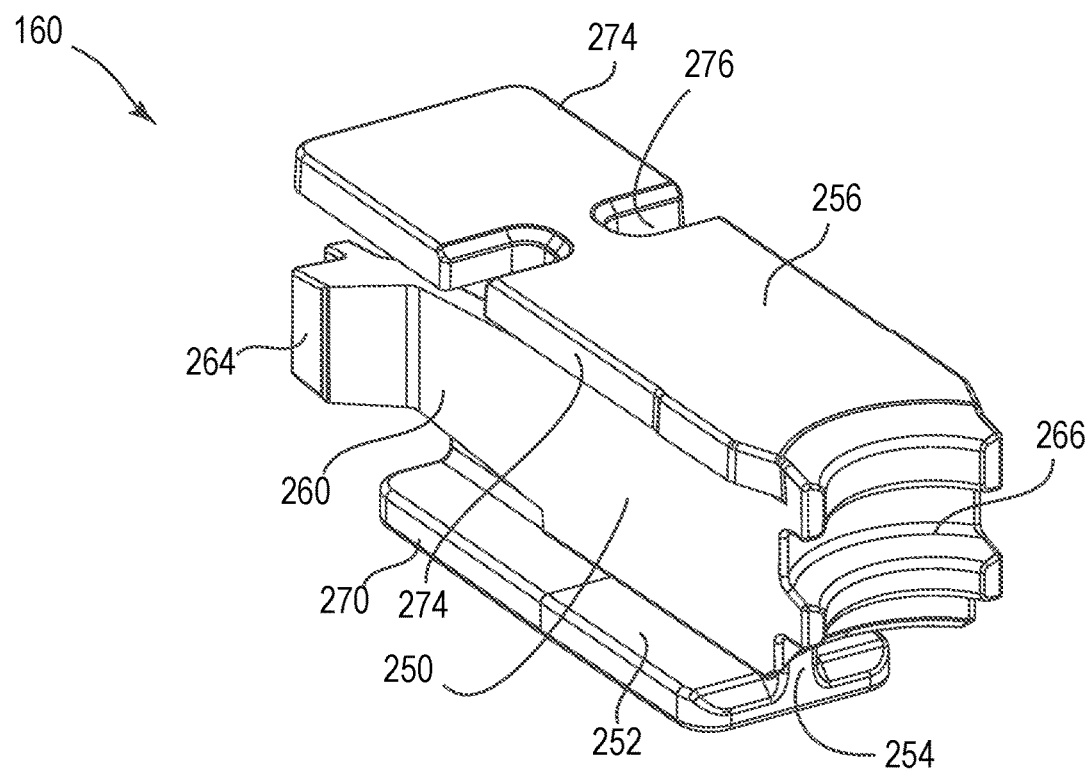
FIG. 12 is an alternate perspective view illustration of a locking clip of the shopping cart of FIG. 1, according to an embodiment of the invention.

FIGS. 11 and 12 illustrate one example of a locking clip 160; however, it should be noted that locking clips of various configurations are contemplated. Locking clip 160 includes a main body 250, an inside flange 252, an offsetting step 254, and a front plate 256, in one embodiment. Main body 250 provides the primary size and shape of locking clip and is sized to fit within locking chamber 114. In one example, main body 250 includes a pair of resilient locking fingers 260 spaced apart from one another and each having a protruding block 264 on a free end thereof facing in an opposite direction the other. Each of locking fingers with protruding blocks 264 collectively define a width wider than locking chamber 114 but with sufficient elastomeric give to allow locking fingers 260 to be pushed toward one another via compression to fit within and slide into locking chamber 114.

A top 266 of main body 250 is generally curvilinear to align with a bottom of coupling plug 110, in one example, so as not to impede rotation of gate 12 on coupling plugs 110. Inside flange 252 is generally planar and rectangular and offset from main body 250 via offset stem 254. Offset stem 254 is quite narrow in width, for example, sufficiently narrow such that offset stem 254 is sized to fit within dividing slot 156 of interior wall of locking chamber 144 of gate 12. Flange 252 is wider that offset stem 254 to securely extend to either side of dividing slot 156 during assembly to opposing free edges 270 on either side thereof.

On an opposite side of main body 250 than flange 252, locking clip 160 includes front plate 256 which generally has a width larger than main body 250 other than protruding blocks 264. Front plate 256 is generally rectangular other than a curvilinear top matching top 266 of main body 250. In one example, front plate 256 extends between two opposing side edges 274 and an access notch 276 extends inwardly from at least one of the two opposing side edges 274. The one or more access notch 276 allows a user access therethrough to one of locking fingers 260 to push the corresponding locking finger 260 inwardly to release locking clip 160 from locking chamber 144 if necessary to uncoupled gate 12 from shopping cart 10.

Turning back to FIGS. 10-13, during use locking clip 160 is placed in locking chamber 144 below one of coupling plugs 110 with curvilinear top 266 facing the one of coupling plugs 110 and aligning offset stem 254 with dividing slot 156. When so placed, locking fingers 260 of locking clip 160 are compressed to fit within locking chamber 144. Then, locking clip 160 is slide upwardly as generally indicated by arrow C. Upward movement of locking clip 160 through dividing slot 156, moves offset stem 254 through dividing notch until curvilinear top 266 is positioned just below coupling plugs 110. When locking clip 160 is positioned just below coupling plugs 110, locking fingers 260 are positioned so protruding blocks 264 align with openings 153 through locking chamber front wall 150 and/or primary panel 120 of gate 12. The elastomeric and resilient nature of locking fingers 260 pushes protruding blocks 264 through properly sized openings 153 to vertically lock locking clip 160 in place in locking chamber 144 until desired release. For desired release, a suitable tool is thread through an access notch 276 in front plate 256 to push on a locking finger 260 to move its protruding block 264 out of its corresponding opening 153 in locking chamber 144 to thereby release the locking clip 160 from locking chamber 144.

Figure 14:
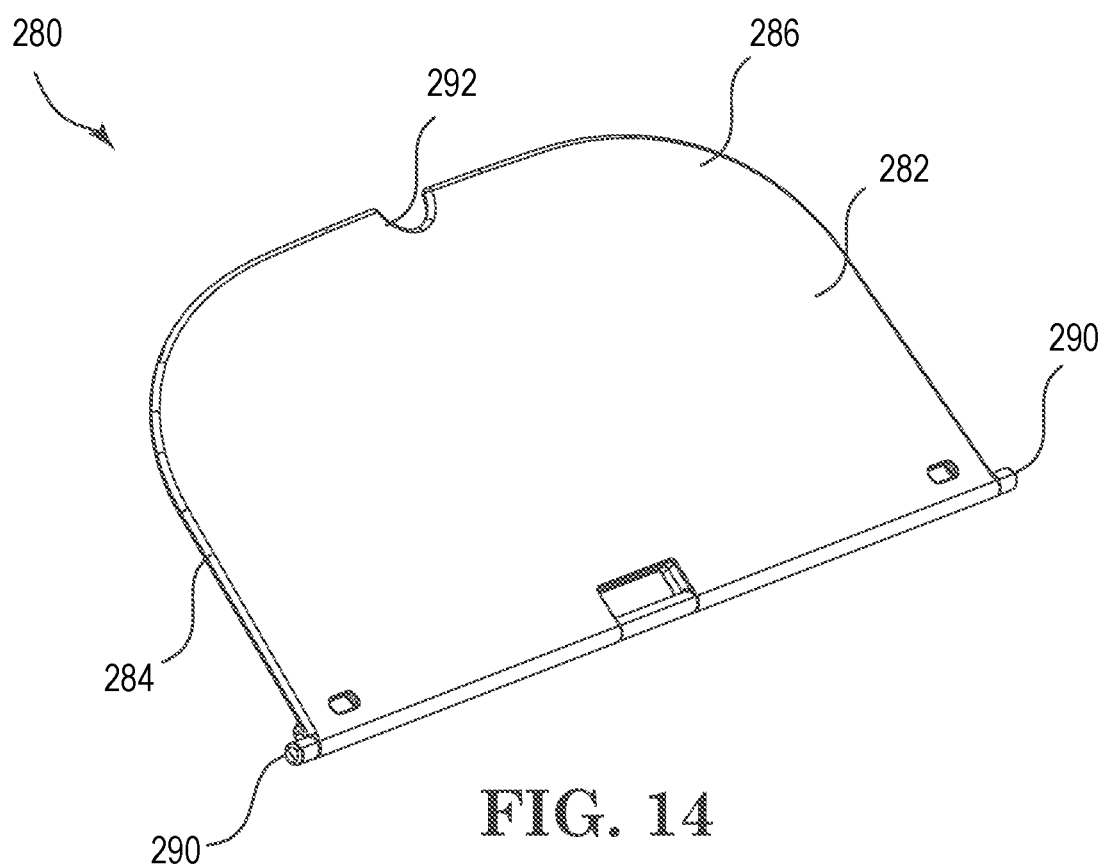
FIG. 14 is a perspective view illustration of a seat plate of the shopping cart of FIG. 1, according to an embodiment of the invention.

FIG. 14 illustrates a seat plate 280, which may additionally be incorporated into child seat 14. Seat plate 280 is configured to one or more of provide a more comfortable seating surface to a child and to cover bottom apertures 182 such that items held by the child or child seat 14 itself are less likely to fall through bottom apertures 182. Seat plate 280 is shaped similarly to bottom panel 170 of child seat 14, but slightly small and can be formed from a planar material or a molded or otherwise formed material design with curvature to be more ergonomically comfortable for a general child. Seat plate 280 defines a bottom surface 284 for selectively resting against bottom panel 170 of child seat 14 and a top surface 286 facing opposite bottom surface 284 for receiving a child, etc. A perimeter edge extends around seat plate 280 between bottom surface 184 and top surface 286.

Seat plate 280 is configured to rotate from a first or use position on bottom panel 170 of child seat 14 and a second or storage position substantially covering leg openings 164 and spaced away from bottom panel 170 of child seat 14. In this manner, two opposing coupling nibs 290 extends opposite one another and both along a rotational axis of seat plate 280. Each coupling nib 290 embeds or is otherwise rotatably coupled to child seat 14 within the confines of child seat 14 adjacent bottom panel 170. In this manner, seat plate 280 is selectively rotatable to cover bottom panel 170 of child seat 14 about coupling nibs 290, as will be apparent to those of skill in the art upon reading this application. In one example, seat plate 280 includes a cutout or notch 192 opposite rotational axis 288 to facilitate a user in grasping perimeter edge 286 to flip up and down seat plate 280.

Figure 15:
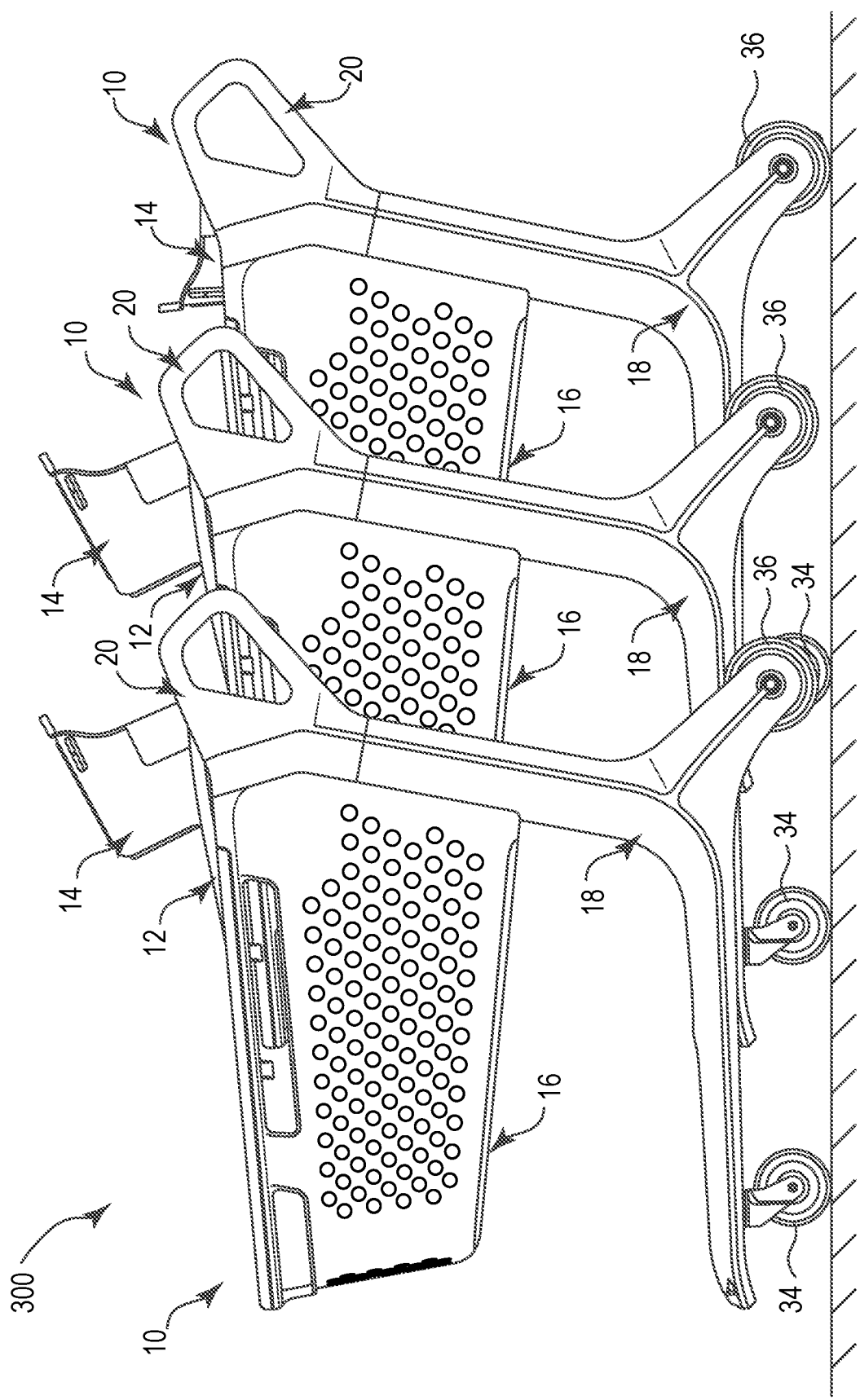
FIG. 15 is a right side view illustration of a horizontal stack of three shopping carts, according to an embodiment of the invention.

In one aspect, gate 12 with child seat 14 is configured to be pivoted upward within basket 16 to enable horizontal stacking or nesting of multiple shopping carts 10 together to form a stack of shopping carts 300 as will be apparent to those of skill in the art upon reading the present application and as generally shown in FIG. 15. In one example, child seat 14 extends forwardly from gate 12 to cantilever from gate 12 into and/or over a portion of compartment 24 of basket 16. When a second shopping cart 10 is horizontally stacked with a first shopping cart 10, a front end of basket 16 of the rear or second shopping cart 10 is pushed into contact with rear surface 124 of gate 12 of the front shopping cart 10 causing gate 12 of front shopping cart 10 to rotate upwardly with child seat 14 to allow part of basket 16 of second shopping cart 10 to be positioned and stored within the rear part of basket 16 of front shopping cart 10. In this manner, each child seat 14 of one of the front shopping carts 10 is rotated to be positioned above the tops of those same shopping carts 10 as shown in FIGS. 15.

Although the invention has been described with respect to particular embodiments, such embodiments are meant for illustrative purposes only and should not be considered to limit the invention. Various alternatives and changes will be apparent to those of ordinary skill in the art upon reading this application. Other modifications within the scope of the invention and its various embodiments will be apparent to those of ordinary skill.

What is claimed is:

1. A shopping cart comprising:
a wheeled base;
two support masts coupled to and extending upwardly from the wheeled base;
a basket coupled to the two support masts and extending over the wheeled base, the basket defining a compartment having a rear opening;
a gate including:
a primary panel rotatable between a first position, covering the rear opening, and a second position extending above the compartment, and
a child seat extending from a front surface of the primary panel and into the compartment when the primary panel is in the first position, the child seat comprising a bottom panel, a back support, and opposing side panels, the bottom panel, the back support, and opposing side panels collectively forming a continuous child seat surround, together with and extending from a first side of the primary panel to a second side of the primary panel;
wherein a position of the bottom panel of the child seat relative to each of the primary panel of the gate and the back support of the child seat is fixed.

2. The shopping cart of claim 1, wherein the primary panel defines child leg reception apertures, and the child seat surround extends from the first side of the primary panel to the second side of the primary panel around the child leg reception apertures.

3. The shopping cart of claim 1, wherein the back support, the opposing side panels and the primary panel collectively extend around an entirety of a perimeter of the bottom panel.

4. The shopping cart of claim 1, wherein the child seat and the primary panel are formed as a single injection molded piece of material.

5. The shopping cart of claim 1, wherein the primary panel is substantially planar, and the gate includes strengthening flanges extending around the primary panel in a direction substantially perpendicular to the primary panel.

6. The shopping cart of claim 1, wherein the gate further comprises a cupholder extending from the front surface of the primary panel and to one of the opposing side panels, the cupholder having a bottom wall.

7. The shopping cart of claim 6, wherein the child seat, the cupholder, and the primary panel are formed as a single injection molded piece of material.

8. The shopping cart of claim 6, wherein the cupholder is a first cupholder, and the gate further comprises a second cupholder extending from the front surface of the primary panel and to the other one of the opposing side panels.

9. The shopping cart of claim 8, wherein the child seat, the first cupholder, the second cupholder and the primary panel are formed as a single injection molded piece of material.

10. The shopping cart of claim 1, wherein:
the shopping cart includes:
two handles where each of the two handles extends from a top of a different one of the two support masts, and
two coupling plugs extending above the rear opening of the basket, each of the two coupling plugs extending from a different one of the two handles toward the other one of the two coupling plugs,
the gate includes a top tubular channel having a first open end and a second open end opposite the first open end, and
the first open end receives one of the two coupling plugs and the second open end receives the other of the two coupling plugs such that the gate is rotatable about an axis defined through the two coupling plugs.

11. A shopping cart comprising:
a wheeled base;
two support masts coupled to and extending upwardly from the wheeled base;
a basket coupled to the two support masts and extending over the wheeled base, the basket defining a compartment having a rear opening;
a gate including:
a primary panel rotatable between a first position, covering the rear opening, and a second position extending above the compartment,
a child seat extending from a front surface of the primary panel and into the compartment when the primary panel is in the first position, the child seat comprising a bottom panel, a back support, and opposing side panels, the bottom panel, the back support, and opposing side panels collectively forming a continuous child seat surround, together with and extending from a first side of the primary panel to a second side of the primary panel;
wherein:
the gate defines a locking chamber below the first open end,
the locking chamber includes an elongated slot and at least one locking notch,
the shopping cart includes a locking clip configured to slide within the locking notch to interact with a bottom of the coupling plug and including a locking finger with protruding block, and
the protruding block is configured to be selectively received within the at least one locking notch to further secure the gate relative to the coupling plug.

12. A gate for use on a shopping cart including a basket defining a compartment and a rear opening to the compartment, the gate comprising:

a primary panel rotatable between a first position, covering the rear opening, and a second position extending above the compartment, a child seat extending from a front surface of the primary panel and into the compartment when the primary panel is in the first position, the child seat comprising a bottom panel, a back support, and opposing side panels, the bottom panel, the back support, and opposing side panels collectively forming a continuous child seat surround, together with and extending from a first side of the primary panel to a second side of the primary panel;

wherein the continuous child seat surround extends from a first side of the primary panel to a second side of the primary panel in both the first position and the second position.

13. The gate of claim 12, wherein the primary panel defines child leg reception apertures, and the child seat surround extends from the first side of the primary panel to the second side of the primary panel around the child leg reception apertures.

14. The gate of claim 12, wherein the back support, the opposing side panels, and the primary panel collectively extend around an entirety of a perimeter of the bottom panel.

15. The gate of claim 12, wherein the child seat and the primary panel are formed as a single injection molded piece of material.

16. The gate of claim 12, wherein the primary panel is substantially planar, and the gate includes strengthening flanges extending around the primary panel in a direction substantially perpendicular to the primary panel.

17. The gate of claim 12, wherein the gate further comprises a cupholder extending from the front surface of the primary panel and to one of the opposing side panels, the cupholder having a bottom wall.

18. The gate of claim 17, wherein the child seat, the cupholder, and the primary panel are formed as a single injection molded piece of material.

19. The gate of claim 12, wherein:
the shopping cart includes two coupling plugs extending above the rear opening of the basket toward one another,
the gate includes a top tubular channel having a first open end and a second open end opposite the first open end,
the first open end receives one of the two coupling plugs and the second open end receives the other of the two coupling plugs such that the gate is rotatable about an axis defined through the two coupling plugs.

20. A gate for use on a shopping cart including a basket defining a compartment and a rear opening to the compartment, the gate comprising:
a primary panel rotatable between a first position, covering the rear opening, and a second position extending above the compartment,
a child seat extending from a front surface of the primary panel and into the compartment when the primary panel is in the first position, the child seat comprising a bottom panel, a back support, and opposing side panels, the bottom panel, the back support, and opposing side panels collectively forming a continuous child seat surround, together with and extending from a first side of the primary panel to a second side of the primary panel;
wherein:
the gate defines a locking chamber below the first open end,
the locking chamber includes an elongated slot and at least one locking notch,
the gate includes a locking clip configured to slide within the locking notch to interact with a bottom of the coupling plug and including a locking finger with protruding block, and
the protruding block is configured to be selectively received within the at least one locking notch to further secure the gate relative to the coupling plug.

* * * * *